US012657951B2

(12) United States Patent
Singh et al.

(10) Patent No.: US 12,657,951 B2
(45) Date of Patent: Jun. 16, 2026

(54) DIGITAL VERIFICATION OF USERS BASED ON REAL-TIME VIDEO STREAM

(71) Applicant: PayPal, Inc., San Jose, CA (US)

(72) Inventors: Vishal Kumar Singh, Howrah (IN); Padmapriya Mohankumar, Chennai (IN); Ashraf Kamal, New Delhi (IN)

(73) Assignee: PayPal, Inc., San Jose, CA (US)

( * ) Notice: Subject to any disclaimer, the term of this patent is extended or adjusted under 35 U.S.C. 154(b) by 353 days.

(21) Appl. No.: 18/059,212

(22) Filed: Nov. 28, 2022

(65) Prior Publication Data

US 2024/0177519 A1     May 30, 2024

(51) Int. Cl.
| | |
|---|---|
| *G06F 21/32* | (2013.01) |
| *G06V 10/74* | (2022.01) |
| *G06V 10/82* | (2022.01) |
| *G06V 30/10* | (2022.01) |
| *G06V 40/16* | (2022.01) |

(Continued)

(52) U.S. Cl.
CPC ............ *G06V 40/16* (2022.01); *G06V 10/761* (2022.01); *G06V 10/82* (2022.01); *G06V 30/10* (2022.01); *G06V 40/171* (2022.01); *G06V 40/20* (2022.01); *G06V 40/45* (2022.01)

(58) Field of Classification Search
CPC .... G06V 40/16; G06V 40/165; G06V 40/168; G06V 40/172; G06V 40/174; G06V 40/179; G06V 40/20; G06V 40/40; G06V 40/45; G06V 40/55; G06V 40/70; G06V 40/00; G06V 30/41; G06V 30/418; G06V 10/764; G06V 10/809; G06V 10/811; G06V 10/87; G06V 30/10; G06V 40/171; G06V 10/761; G06V 10/82
See application file for complete search history.

(56) References Cited

U.S. PATENT DOCUMENTS

| | | |
|---|---|---|
| 9,600,725 B2 | 3/2017 | Li et al. |
| 9,760,970 B2 | 9/2017 | Abeykoon et al. |

(Continued)

FOREIGN PATENT DOCUMENTS

WO     WO-2022104340 A1 *     5/2022     ............. G06V 40/16

OTHER PUBLICATIONS

Atoum Y, Liu Y, Jourabloo A, Liu X. Face anti-spoofing using patch and depth-based CNNs. In2017 IEEE international joint conference on biometrics (IJCB) Oct. 1, 2017 (pp. 319-328). IEEE. (Year: 2017).*

*Primary Examiner* — Oneal R Mistry
*Assistant Examiner* — Duy Tran
(74) *Attorney, Agent, or Firm* — Kowert, Hood, Munyon, Rankin & Goetzel, P.C.; Scott W. Pape; Dean M. Munyon

(57)     ABSTRACT

Techniques are disclosed relating to receiving, by a computer system from a user, a request to authorize the user. The technique may further include receiving, by the computer system, a live video stream of the user, and requesting, by the computer system, the user to submit an identification document from a list of authorized identification documents. While the user submits the identification document, the technique may also include detecting liveliness of the user in the live video stream by using a gesture recognition operation. Additionally, the technique may include determining, using the submitted identification document and the detected liveliness, whether to proceed with the request to authorize the user.

20 Claims, 12 Drawing Sheets

900

(51) Int. Cl.
    *G06V 40/20*        (2022.01)
    *G06V 40/40*        (2022.01)

(56)               References Cited

U.S. PATENT DOCUMENTS

| | | | |
|---|---|---|---|
| 10,094,655 | B2 | 10/2018 | Sabitov et al. |
| 10,268,911 | B1 * | 4/2019 | Wu ..................... G06V 40/171 |
| 10,654,942 | B2 | 5/2020 | Resnick et al. |
| 2014/0351913 | A1 * | 11/2014 | McGilliard ............ H04L 63/10 |
| | | | 726/7 |
| 2015/0310259 | A1 * | 10/2015 | Lau ..................... G06V 40/169 |
| | | | 382/118 |
| 2016/0162729 | A1 * | 6/2016 | Hagen ................... G06V 40/67 |
| | | | 382/118 |
| 2016/0342851 | A1 * | 11/2016 | Holz ..................... G06V 40/70 |
| 2020/0042685 | A1 * | 2/2020 | Tussy ................. H04L 63/0861 |
| 2020/0366671 | A1 * | 11/2020 | Larson ................. H04L 9/3231 |

* cited by examiner

System *100*

Distributed Computing System 200

Distributed Computing System  300

Example <u>400</u>

*Face Spoofing Detection Model 232a*

Image 650

Facial Features 655 activation vector 660a activation vector 660b activation vector 660c activation vector 660d Face Morphing Detection Model 232b Face Marker Detection Model 232c

900

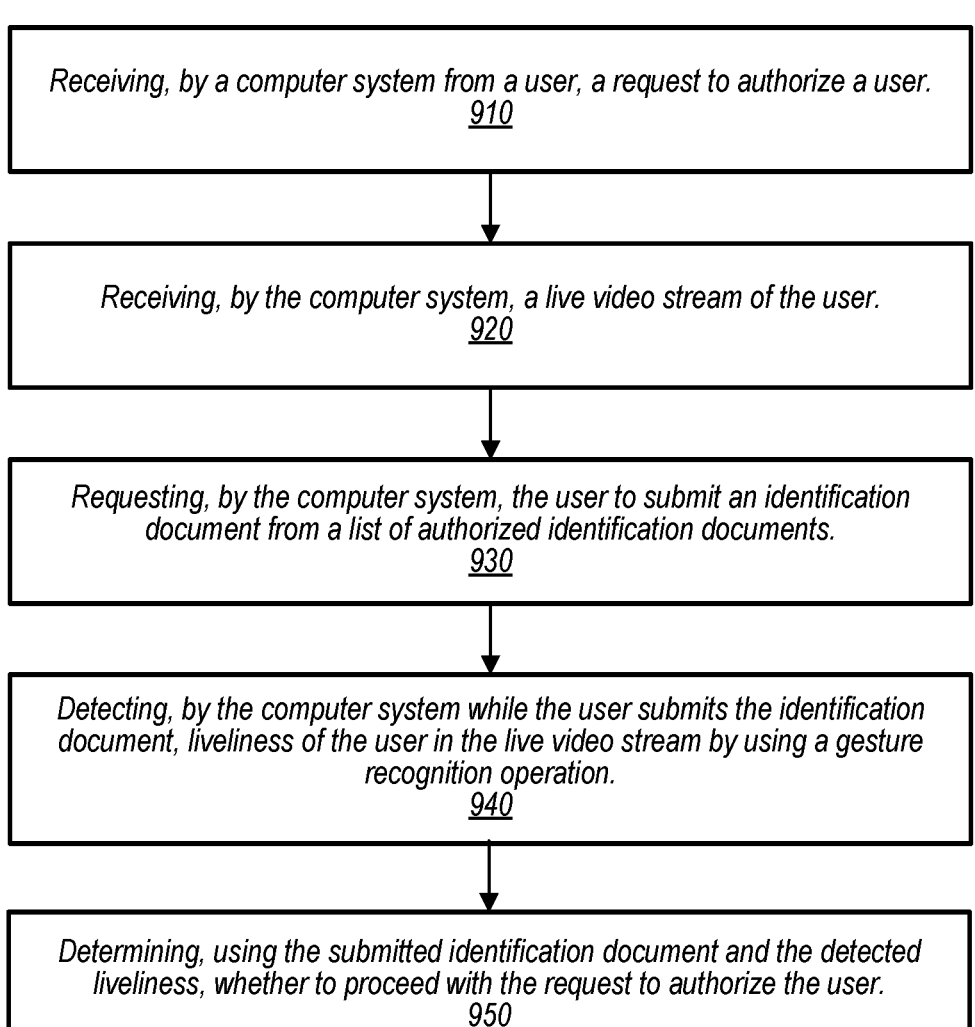

Receiving, by a computer system from a user, a request to authorize a user.
910

Receiving, by the computer system, a live video stream of the user.
920

Requesting, by the computer system, the user to submit an identification document from a list of authorized identification documents.
930

Detecting, by the computer system while the user submits the identification document, liveliness of the user in the live video stream by using a gesture recognition operation.
940

Determining, using the submitted identification document and the detected liveliness, whether to proceed with the request to authorize the user.
950

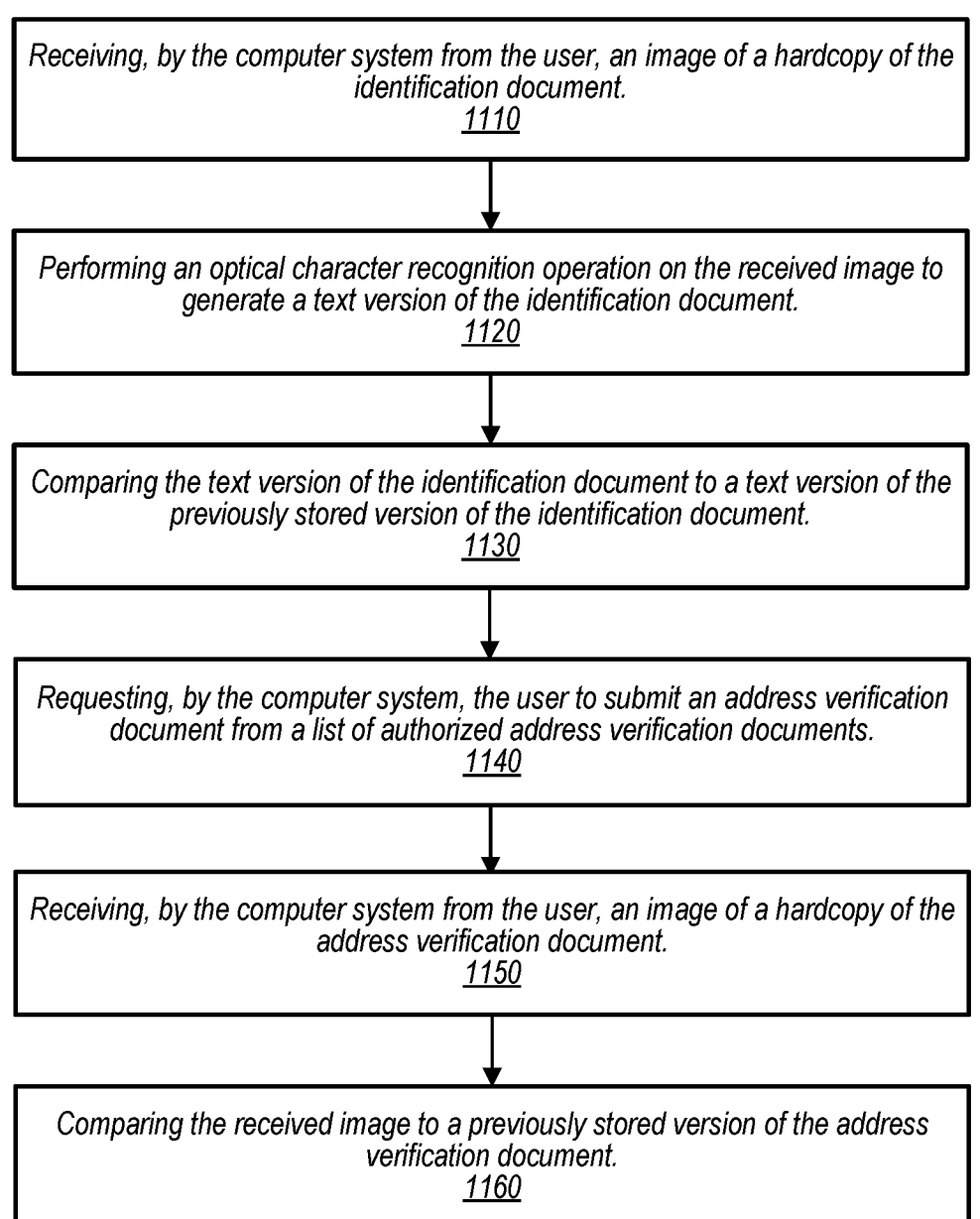

*Receiving, by the computer system from the user, an image of a hardcopy of the identification document.*
*1110*

*Performing an optical character recognition operation on the received image to generate a text version of the identification document.*
*1120*

*Comparing the text version of the identification document to a text version of the previously stored version of the identification document.*
*1130*

*Requesting, by the computer system, the user to submit an address verification document from a list of authorized address verification documents.*
*1140*

*Receiving, by the computer system from the user, an image of a hardcopy of the address verification document.*
*1150*

*Comparing the received image to a previously stored version of the address verification document.*
*1160*

*FIG. 11*

DIGITAL VERIFICATION OF USERS BASED ON REAL-TIME VIDEO STREAM

BACKGROUND

Technical Field

Embodiments described herein are related to the field of computer security, and more particularly to techniques for performing remote user authentication.

Description of the Related Art

User verification processes may be used for authenticating users in various services in which determining an authentic identity is a primary concern. For example, in information security, user in financial services, user authentication may be used to protect against fraud, identity theft, money-laundering, and the like. Such user verification processes may include in-person interview, which may be a time-consuming and tedious task. Alternatively, a video-based interview may be utilized which can deal with several constraints, such as geographical, high onboarding cost, and lengthy documentation. With the advancement of technology in the current era of artificial intelligence, the risk of false identification is high, and may be achieved by a fraudulent entity by applying face-swapping videos, face morphing, fake liveliness, etc.

BRIEF DESCRIPTION OF THE DRAWINGS

The following detailed description makes reference to the accompanying drawings, which are now briefly described.

FIG. 9 depicts a flow diagram of an embodiment of a method for performing a first stage of live video authorization.

FIG. 11 shows a flow diagram of an embodiment of a method for performing a document analysis module during a live video authorization.

DETAILED DESCRIPTION OF EMBODIMENTS

Figure 1:
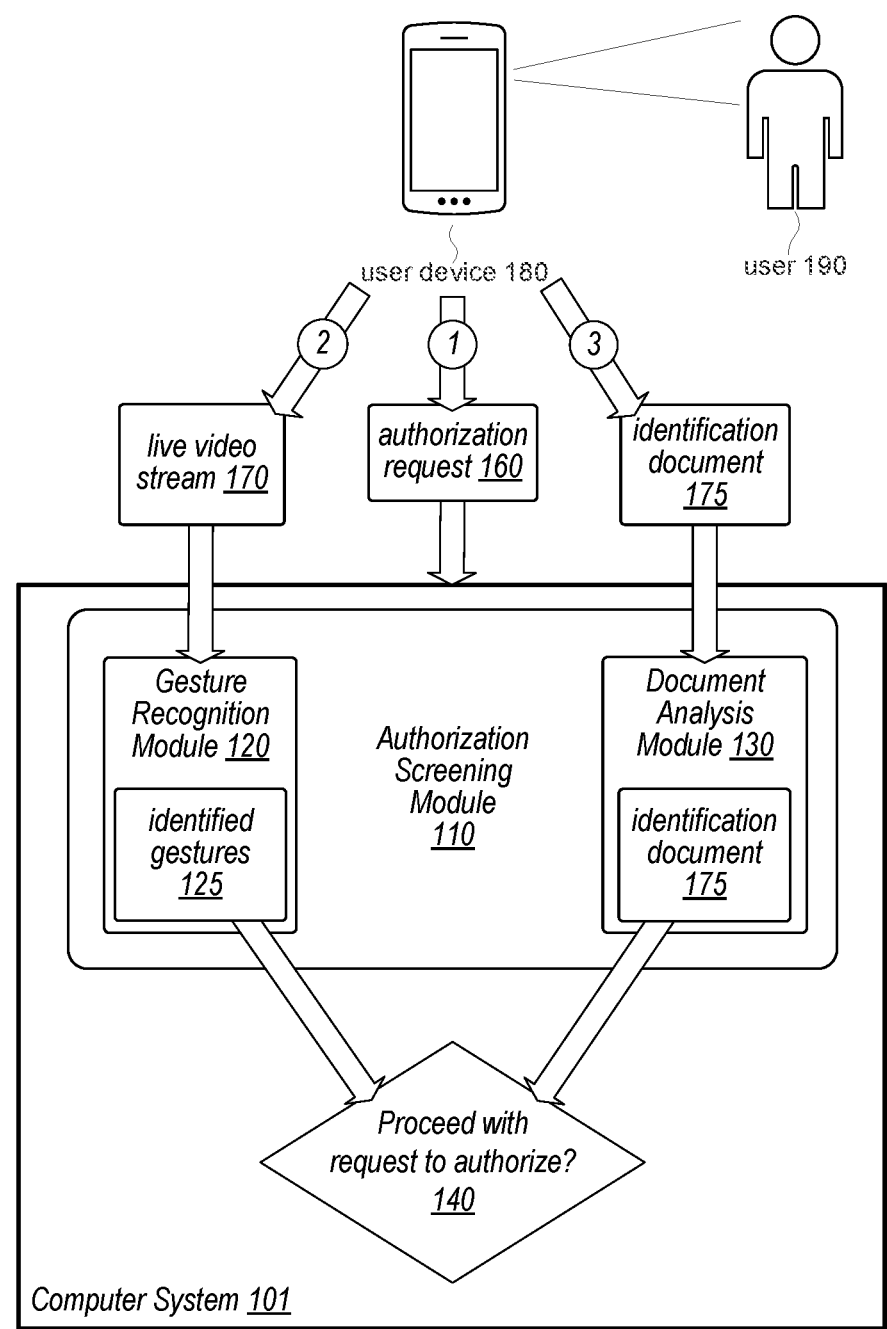
FIG. 1 illustrates a block diagram of an embodiment of a system for performing a live video authorization.

Many services that are provided online perform various levels of user authentication to validate a user's true identity.

For example, some online services may send a verification email to an email address provided by a user when creating a new account. While this technique validates that the user entered a valid email address, some email addresses may be created without any user identity validation, resulting in no genuine identification of the person or entity creating the account. Other online services may require more stringent requirements for validating identity. For example, such services may require a government issued photo identification (ID) and, in some cases, additional proof-of-address documentation in order to validate identity. For services in which user identity is a critical concern, in-person interviews may be performed in order to validate user identity. In-person interviews, however, may be difficult and/or costly in terms of arranging and attending by two or more parties, e.g., the interviewer and interviewee.

The rise and proliferation of remote video conferencing services (e.g., Zoom, Webex by Cisco, Microsoft Teams, and the like) has enabled "face-to-face" interviews to be performed between two or more entities on a global scale. Remote video conferencing, therefore, may be a viable alternative to in-person interviews, allowing the interviewer to both visually and audibly interact with the interviewee in real-time, and thereby potentially reducing both time and expense for performing the interview. Technology, however, presents several challenges to using remote video conferencing as a tool for validating a person's identity. The advancement of artificial intelligence technology may increase the risk of false identification by a fraudulent entity utilizing technologies such as face-swapping, face morphing, fake liveliness, and such.

Accordingly, a method for detecting faked images of a person in a video stream is desired. The techniques disclosed herein describe an online identification process using video-based interviews in combination with one or more types of convolutional neural networks trained to detect various identity-masking and identity-theft techniques. The disclosed approach includes prescreening the user, and then using a plurality of facial analysis models to detect signs of fraudulent behavior. Techniques such as the ones disclosed may increase an ability to spot faked images in a video stream, thereby increasing reliability of remote interviews and enabling their increased usage. Increased use of remote interviews may, in turn, reduce travel costs associated with "face-to-face" interviews, as well as saving time and resources by enabling a single interviewer to meet with a larger number of interviewees across a much wider geographic area.

For example, a technique is disclosed that may include receiving, by a computer system from a user device, a request to authorize a user. A live video stream of the user may be received by the computer system from the user device. For example, the user device may include a camera or have a camera attached. The computer system may request that the user submits an identification document from a list of authorized identification documents. Submission of the document may be performed, e.g., by holding the document in front of the camera. In other embodiments, a photo or scan of the document may be selected by the user and uploaded via a user interface. While the user submits the identification document, the computer system may detect liveliness of the user in the live video stream by using a gesture recognition operation. For example, detecting the liveliness may include aligning motions of the user in the video stream to input received by the computer system via the user interface displayed on the user device. Using the submitted identification document and the detected liveliness, the computer system may then determine whether to proceed with the request to authorize the user.

Use of such a technique to perform a remote video interview may enable validation of a user's identity with a reduction in costs and time when compared to in-person interviews. The disclosed techniques may maintain the increased security that may come from "face-to-face," real-time interaction with the user. Occurrences of fraud by a bad actor may be reduced while making the online service available to a global userbase without having to provide local resources for conducting in-person interviews.

While identifying real or fake faces during real-time, remote interviews is used as an example use case throughout this disclosure, other use cases for some or all of the techniques are contemplated. For example, at least some of the disclosed techniques may be used to identify real or fake faces in recorded content, allowing such content to be appropriately labeled and thereby reduce confusion that may result from faked content. The disclosed techniques may also be used to accurately identify an interviewee in order to properly attribute statements and/or actions of the interviewee during an interview.

A block diagram for an embodiment of a system for authorizing a user is illustrated in FIG. 1. As shown, system 100 includes computer system 101 and user device 180. Computer system 101, in various embodiments, may be implemented, for example, as a single computer system, a plurality of computer systems in a data center, as a plurality of computer systems in a plurality of data centers, and other such embodiments. In some embodiments, computer system 101 may be implemented as one or more virtual computer systems hosted by one or more server computer systems. Computer system 101 may be included as part of an online service that authorizes and/or creates accounts for users such as user 190. User device 180 may be a smartphone, a desktop, laptop, or tablet computer, a dedicated kiosk with computing hardware, an automated teller machine (ATM), and the like. Computer system 101 includes authorization screening module 110 that further includes gesture recognition module 120 and document analysis module 130. Computer system 101 and user device 180 may communicate using a wired or wireless network, including any suitable combinations of Wi-Fi, mobile data networks (e.g., fourth-generation (4G) and fifth-generation (5G) broadband cellular networks, Ethernet, satellite broadband, and so forth.

Computer system 101 may include one or more processor circuits and a memory circuit that includes instructions that when executed by processor circuit, cause the system to perform operations described herein. As shown, computer system 101 is operable to receive authorization request 160 from user 190 via user device 180. In various embodiments, authorization request 160 may be part of a request to create a new account for user 190, a request to access an existing account, a request to perform an electronic exchange, and the like. For example, user 190 may request to create a new account associated with a database that includes information with restricted access and, therefore, requires users to be properly vetted prior to being granted access. Accordingly, computer system 101 may determine that authorization request 160 requires a detailed authentication of user 190 in order to proceed.

As illustrated, performing this authentication includes receiving, by computer system 101, live video stream 170 of user 190. For example, in response to receiving authorization request 160, computer system 101 performs authorization screening module 110 which causes user device 180 to request user 190 to initiate live video stream 170. User 190 may then accept this request, and send live video stream 170 using a camera coupled to user device 180 (e.g., a camera in a smartphone, laptop, or tablet computer, or webcam connected to a desktop computer). In some embodiments, user 190 may be required to agree to provide live video stream 170 prior to authorization request 160 being sent to computer system 101.

Computer system 101 may, as shown, request user 190 to submit an identification document 175 from a list of authorized identification documents. E.g., an interface on user device 180 may display a list of acceptable identification documents, such as a government-issued ID (passport, driver's license), an ID issued by an entity operating or contracting with a service that manages computer system 101 (e.g., an employee badge, a student ID issued by an educational institution, an ID issued by a health care provider), or any other suitable form of ID that may be used to validate an identity of user 190. The interface may request that user 190 displays selected identification document 175 in front of the camera that is capturing live video stream 170. Images of identification document 175 may be received by computer system 101 using document analysis module 130, which may then compare these images with images of the same document that have previously been stored in a database. Additional details regarding document analysis module 130 are provided below in regard to FIG. 4.

Operations performed by computer system 101 may further include detecting, while user 190 submits identification document 175, liveliness of user 190 in live video stream 170 by using gesture recognition module 120. Gesture recognition module 120, for example, may monitor liveliness of user 190 in live video stream 170 while user 190 holds identification document 175 in front of the camera. Detecting the liveliness of user 190 may include aligning motions of user 190 to input received by computer system 101 via a user interface displayed on user device 180. For example, to send images of identification document 175, user 190 may need to press a particular element displayed on a screen of user device 180, or manipulate a mouse to click on the element. Such movements by user 190 to click or tap the element may be monitored via live video stream 170 and gesture recognition module 120 may be operable to determine whether the observed movements of user 190 correspond to the selection of the element on the interface. In addition, or alternatively, detecting liveliness may include requesting, via computer system 101, user 190 to perform a particular action in view of the camera. For example, user 190 may be requested to touch their nose, scratch their chin, hold a particular number of fingers up, and the like. Gesture recognition module 120 may be further operable to determine, using live video stream 170, whether user 190 performed the particular action. Gesture recognition module 120 may identify one or more gestures (identified gestures 125).

Computer system 101, as shown, may be further operable to determine (e.g., operation 140), by using identification document 175 and the detected liveliness, whether to proceed with authorization request 160 for user 190. For example, computer system 101 may use one or more images of identification document 175 and identified gestures 125 to determine whether user 190 is a live human or if user 190 is acting fraudulently by using recorded and/or computer generated/enhanced visualizations to appear as someone else. For example, a fraudulent user may attempt to use techniques such as face spoofing and/or face morphing to conceal their true identity (e.g., user 190 is someone who is banned from having an account associated with system 100), to appear as someone else who does have a valid account (e.g., the fraudulent user is attempting to impersonate user 190), and/or for other such motivations.

Use of the disclosed techniques may, for example, provide a manner for prescreening user 190 prior to performing additional analysis. Such additional analysis may include processor-intensive operations that consume non-trivial amounts of bandwidth and are therefore performed by a different computer system than computer system 101. For example, computer system 101 may be one of a plurality of local client servers utilized by an online service. These local client servers may prescreen received authorization requests and then forward relevant information to a centralized server computer system if the user successfully passes the pre-screening. The centralized computer system may then perform the more processor-intensive operations while the local client servers process subsequently received authorization requests.

It is noted that system 100, as illustrated in FIG. 1, is merely an example. FIG. 1 has been simplified to highlight features relevant to this disclosure. In other embodiments, additional elements that are not shown may be included, and/or different numbers of the illustrated elements may be included. For example, computer system 101 may include, or have access to a database that stores information regarding the acceptable forms of identification documents, including images of the identification documents that may be compared to images received via the live video stream.

Figure 2:
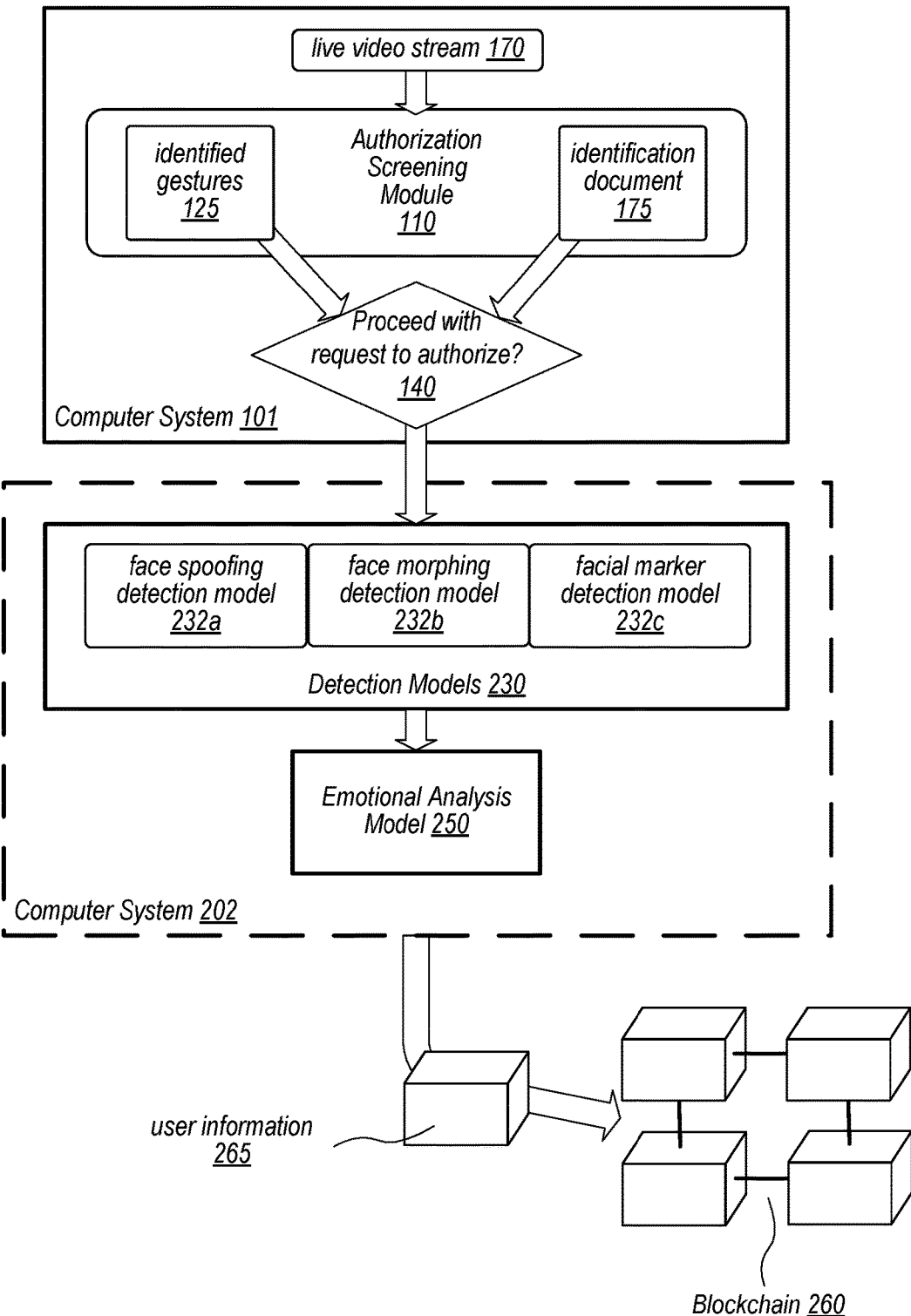
FIG. 2 shows a block diagram of an embodiment of a distributed computing system for performing a live video authorization.

The description of FIG. 1 discloses use of another computer system that may perform additional analysis of the user. Various forms of distributed computing may be utilized to implement the disclosed techniques including, for example, edge computing implementations. FIG. 2 illustrates an example of a distributed computing implementation.

Moving to FIG. 2, an example of a system for authorizing a user that includes use of a distributed computing system is shown. Distributed computing system 200 includes computer system 101, computer system 202, and blockchain 260. Computer system 101 includes authorization screening module 110. Computer system 202 includes detection models 230 and emotional analysis model 250. In a similar manner as computer system 101, computer system 202, may be implemented, for example, as a single computer system, a plurality of computer systems in a data center, as a plurality of computer systems in a plurality of data centers, one or more virtual computer systems hosted by one or more server computer systems, and other such embodiments. Blockchain 260, in various embodiments, may be included within computer system 101, 202, or as part of a different computer system.

In the description of FIG. 1, computer system 101 was described as communicating with user device 180. In some embodiments, computer system 101 may be user device 180. In such embodiments, computer system 101 may include or be coupled to a camera circuit capable of generating live video stream 170 in response to receiving, from a user (e.g., user 190 of FIG. 1), a request to access restricted information associated with the user. For example, the user may activate an application on computer system 101, or may navigate to a website via a browser application on computer system 101. Via the application or website, the user request access to subject matter that requires authentication by computer system 202. As illustrated, however, computer system 101 prescreens the user by performing authorization screening module 110, which requests permission from the user to generate a live video stream using a camera circuit coupled to or included in computer system 101.

In response to receiving an indication of user approval, computer system 101 may generate, using the camera circuit, live video stream 170 of the user. In a manner as described above in regard to FIG. 1, computer system 101 requests the user to display an identification document from a list of authorized identification documents. While the user displays identification document 175, computer system 101 detects liveliness of the user in live video stream 170 by using a gesture recognition operation, thereby capturing identified gestures 125.

As illustrated, computer system 101 determines, using an image of identification document 175 and identified gestures 125, whether to proceed with authorization of the user. For example, if information included in the image of identification document 175 matches information in a corresponding identification document on file for the user, and if identified gestures 125 are consistent with gestures of a live person, then computer system 101 may determine to proceed with the authentication. Otherwise, if identification document 175 and/or identified gestures 125 fail to be validated, then the authentication process may end, and the user may be sent a message indicating this decision.

In response to determining to proceed with the request to authorize the user, computer system 101 may forward live video stream 170 and/or data associated with live video stream 170 to computer system 202. Computer system 202, as shown, may include one or more processor circuits and a memory circuit including instructions that when executed by the one or more processor circuits, cause the system to perform operations described below, including performing one or more of detection models 230, such as face spoofing detection model 232a, face morphing detection model 232b, and/or face marker detection model 232c. Detection models 230 may utilize deep learning neural networks that require more processor power than computer system 101 has, and/or require more training data than to which computer system 101 has access. Computer system 202 may be a centralized server computer that has more computing resources than computer system 101, thereby enabling computer system 202 to perform the one or more detection models 230. Additional details of each of face spoofing detection model 232a, face morphing detection model 232b, and face marker detection model 232c will be provided below in descriptions for FIGS. 6-8, respectively.

In response to completing the one or more detection models 230, computer system 202 may be operable to perform emotion analysis model 250 that includes determining a distance metric for one or more facial features from a baseline set of facial features. For example, emotional analysis model 250 may be used to identify facial features, or may use facial features identified by the one or more detection models 230 that have been performed. These identified facial features may include particular points of the user's face, such as a plurality of points on the user's lips that enable emotional analysis model 250 to make a determination as to whether the user is smiling, frowning, indifferent, and the like. In addition, points in the user's eyes and/or eye brows may be identified to determine if the user's eye movements correspond to similar emotions. Position of the user's head may also be used to determine whether the user is, for example, facing up, down, left, right, or directly ahead. Emotional analysis model 250 may further correlate the combination of facial features to audio of questions and answers between the user and an interviewer participating in the authentication process. By analyzing the combination of determined information, emotional analysis model 250 may be capable of determining a probable emotional state of the user. This emotional state may then be used by computer system 202, and/or the interviewer, to determine whether the user is being honest or if there are indications of deceit or other discomfort in the user's behavior. Indications of deceit or other questionable behavior may cause the interview to be prolonged to gather more information, or to end the authentication process by denying the user's request.

Computer system 101 and/or computer system 202 may store, after determining whether to proceed, information associated with the submitted identification document 175 and the detected liveliness (e.g., identified gestures 125) by adding a new block of user information 265 to blockchain 260. The stored user information 265 may be stored for future training purposes and/or for processing future authentication requests from the user. In some embodiments, particular elements of personal information may be removed from user information 265 based on privacy laws in effect in the user's location. Blockchain 260 may be used in order to provide sufficient security in compliance with laws concerning protection of personal information. In some embodiments, user information 265 is provided directly from computer system 101 to blockchain 260 to avoid any privacy concerns with sharing user information 265 with computer system 202.

It is noted that the embodiment of FIG. 2 is merely an example to demonstrate the disclosed concepts. For clarity, some elements have been omitted. For example, communication between computer systems 101 and 202 may include any suitable number of wired and/or wireless networks with corresponding access points, routers, and so forth. Although blockchain 260 is shown coupled to computer system 202, computer system 101 may have access to blockchain 260 without use of computer system 202.

Figure 3:
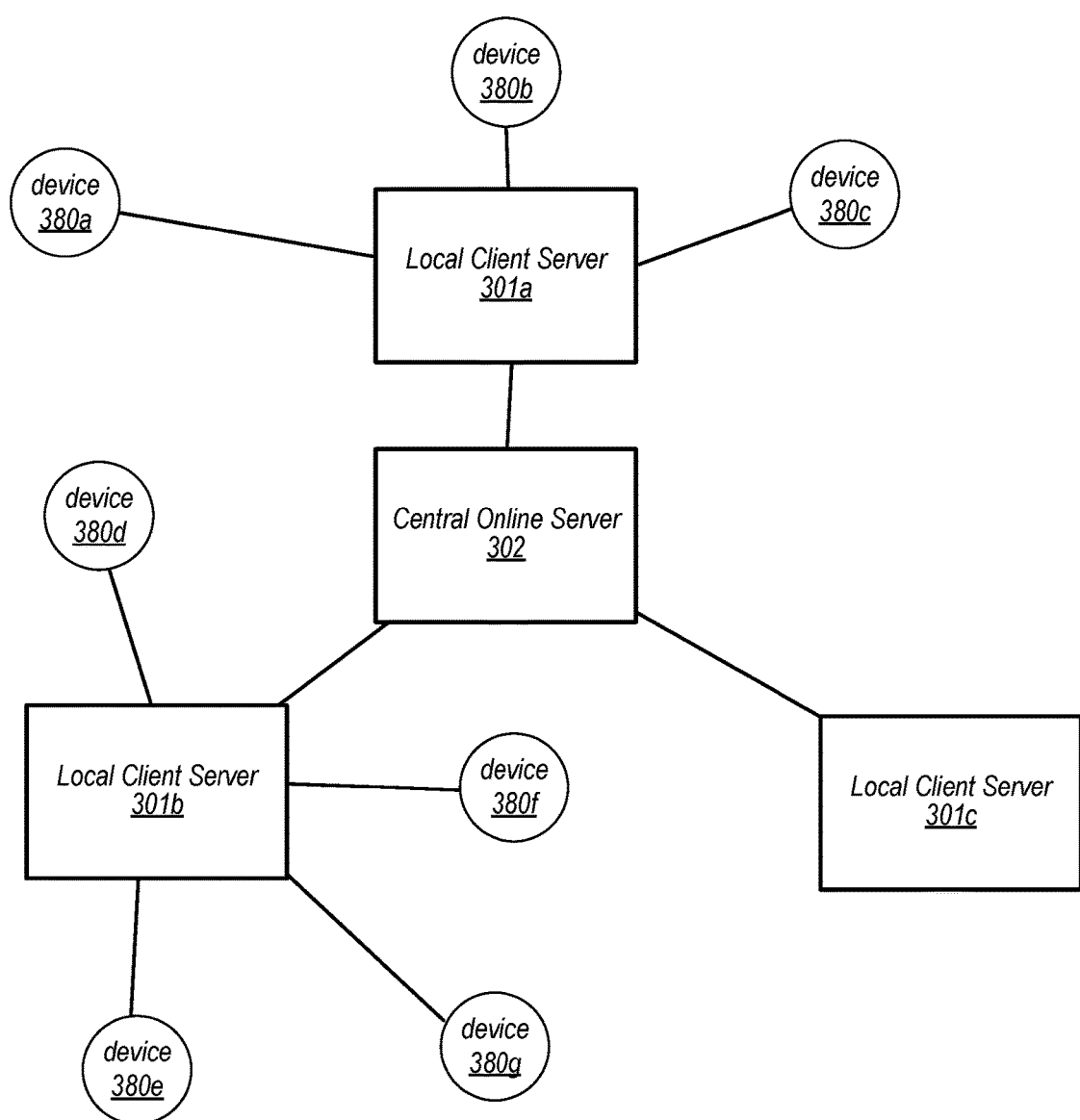
FIG. 3 depicts a block diagram of another embodiment of a distributed computing system for performing a live video authorization.

FIG. 1 described a system in which computer system 101 may communicate with a separate user device. FIG. 2 describes a system in which computer system 101 may be a user device. Various network topologies may be utilized to implement the disclosed techniques. FIG. 3 depicts an example topology.

Turning to FIG. 3, an example of a distributed computing system is shown. Distributed computing system 300 includes central online server 302 coupled to a plurality of local client servers 301a-301c (collectively 301). Local client servers 301a and 301b are each coupled to a respective portion of devices 380a-380g (collectively 380). In a manner as described above, local client servers 301 and/or central online server 302 may be implemented, for example, as a single computer system, a plurality of computer systems in a data center, as a plurality of computer systems in a plurality of data centers, one or more virtual computer systems hosted by one or more server computer systems, or other such embodiments. Connections between local client servers 301 and central online server 302, as well as between local client servers 301 and devices 380, may include any suitable combination of wired and/or wireless networks.

Various combinations of the elements in distributed computing system 300 may perform the various actions described herein. Referring to FIGS. 1 and 2, for example, user device 180 may be device 380a sending authorization request 160 to computer system 101, which in turn, may be local client server 301a, performing authorization screening module 110. Detection models 230 and emotional analysis model 250 are performed by computer system 202 that may correspond to central online server 302. As illustrated, parameters learned by local client servers 301, excluding personal data, may be passed to central online server 302 to perform detection models 230 and emotional analysis model 250. Personal data of the user may be restricted to local client servers 301, and or restricted to devices 380 in accordance with user service agreements and/or local government regulations. Restriction of a user's personal data to their respective devices or to a local client server, may decrease a risk of the information falling into the hands of a fraudulent entity that may attempt identity theft or other forms of illicit usage of such data (e.g., a ransomware attack on the corresponding user).

In some embodiments, local client server 301c may be a user device or authorization kiosk that is capable of performing operations corresponding to authorization screening module 110, and then initiating detection models 230 and emotional analysis model 250 on central online server 302. For example, local client server 301c may be a laptop computer owned by a user onto which the user has installed an application associated with the central online server 302. In other embodiments, local client server 301c may be a kiosk or ATM associated with a business that utilizes an authorization service provided by an entity that operates central online server 302. A user may go to the kiosk/ATM to perform the authentication to setup a new user account and/or access an existing user account.

The application installed in local client servers 301 may enable local client servers 301 to perform authorization screening module 110. In some embodiments, features learned by performing authorization screening module 110 may be sent to central online server 302, with person information removed. Authorization screening module 110 may include use of one or more machine-learning models and these features may be learned via performance of such models. By sending the learned features to central online server 302, features learned by the plurality of local client servers 301 from interaction with their respective ones of devices 380 may provide a wide variety of training data that can be assimilated, organized, and used by central online server 302.

For example, distributed computing system 300 may be an edge computing system that utilizes computing bandwidth of local client servers 301 to both offload computing demand from central online server 302 and limit distribution of a user's personal data beyond the local client servers 301. An edge computing system may reduce an amount of data transmitted between local client servers 301 and central online server 302. By reducing data traffic over networks that may otherwise see high amounts of traffic, latency may be reduced as less information is exchanged, thereby increasing efficiency and bandwidth for performing other tasks.

Local client servers 301 may interact with devices 380 to receive the personal data needed to establish an initial judgement of the user's identity. If the authorization process proceeds to use of detection models 230 and emotional analysis model 250, then the features used to perform these models may be extracted at the local client server 301, and only processed features may be sent to central online server 302. This extraction of features at a local level may eliminate a need to send a live video stream to central online server 302. Instead, extracted features are sent to central online server 302 which may then use the received features to perform detection models 230 and emotional analysis model 250. In other embodiments, local client servers 301 may perform detection models 230 and emotional analysis model 250 along with authorization screening module 110.

As illustrated, central online server 302 may be a federated server computer that uses received features to update a baseline set of models, including, for example, models used in authorization screening module 110, detection models 230, and emotional analysis model 250. Local client servers 301 may then receive, from central online server 302, updates for the models. As local client servers 301 continue to perform the models, new extracted features may be sent to central online server 302, thereby providing a continuing cycle of learning from the models followed by a subsequent updating to the models.

It is noted that FIG. 3 is an example to demonstrate the disclosed techniques. Only elements needed to illustrate these techniques are shown. For example, distributed computing system 300 may include more than the three local client server that are illustrated. Various ones of the local client servers may be coupled to a greater number of devices than shown, including hundreds, thousands, or millions of devices based on a size of a given local region supported by a respective local client server.

Figure 4:
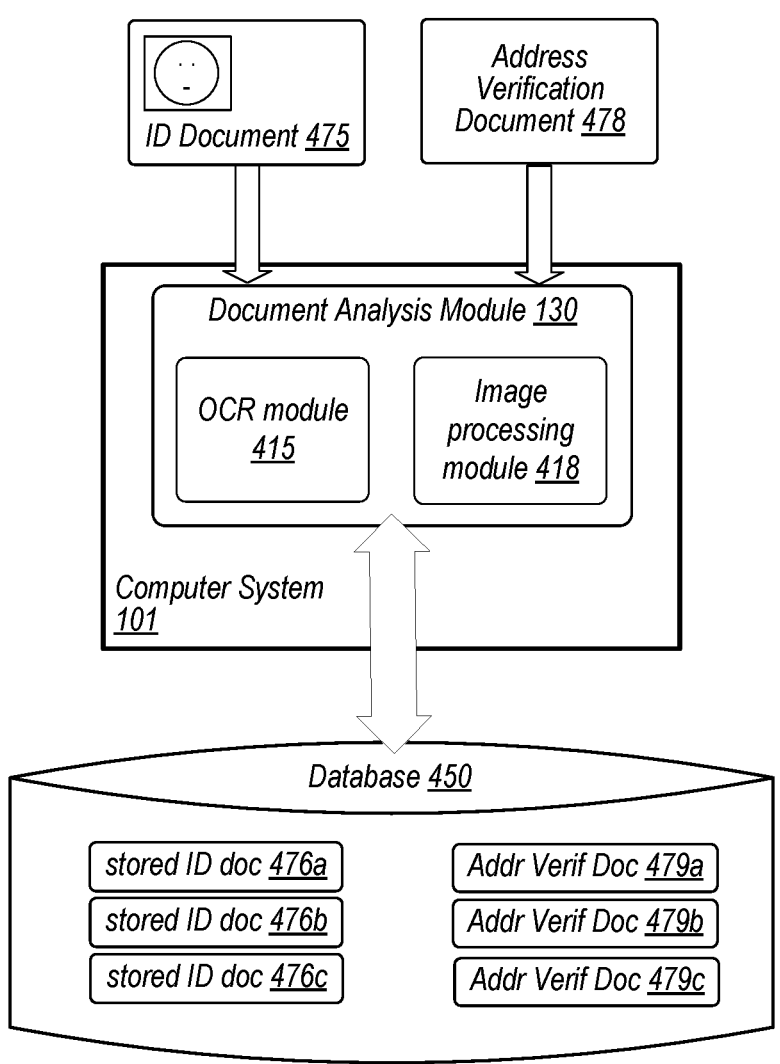
FIG. 4 illustrates an example of performing a document analysis from a live video stream.

The description of FIG. 1 includes a description of a document analysis module that determines whether a received image of a submitted identification document matches information on file for the user submitting the document. Such document analysis may include various techniques for determining validity of a document. FIG. 4 illustrates an example of a document analysis module.

Proceeding to FIG. 4, a diagram of an example technique for implementing a document analysis model is depicted. Example 400 includes computer system 101 and database 450. Computer system 101 includes document analysis module 130 which further includes optical character recognition (OCR) module 415 and image processing module 418. Database 450 includes a plurality of stored identification documents (stored ID docs) 476a-476c (collectively 476) and address verification documents (addr verif docs) 479a-479c (collectively 479) that each correspond to a respective user.

As disclosed above, computer system 101 may request a user to submit an identification document from a list of authorized identification documents such as a government-issued ID, an ID issued by an entity operating or contracting with a service that manages computer system 101, or any other suitable form of ID that may be used to validate an identity of a user. The user may be instructed to display identification document 175 in front of the camera that is capturing a live video stream.

As illustrated, computer system 101 receives an image of a hardcopy of identification (ID) document 475 (which may correspond to identification document 175, as shown in FIG. 1), and compares the received image to a previously stored version of the identification document. For example, database 450 holds stored identification documents 476, one of which may correspond to the user who is presenting identification document 475. In some embodiments, database 450 may be maintained by a same entity that provides the authentication service, in which case a given one of stored identification documents 476 may be added to database 450 a first time that a respective user initiates an account with the authentication service. In other embodiments, database 450 may be maintained by a third-party entity, such as an issuer of the particular type of identification documents. For example, a state government may maintain a searchable database for issued driver's licenses or a national government may maintain a database for issued passports. In such cases, an amount of data available from database 450 may be limited for privacy reasons.

The comparing, in the present example, includes performing an optical character recognition operation (e.g., using OCR module 415) on the received image to generate a text version of at least portions of identification document 475. This text version of identification document 475 may then be compared to an equivalent text version of a corresponding one of stored identification documents 476. In some embodiments, the text version may be compared to information that was previously provided by user using means other than the particular identification document 475. In addition to performing a text comparison, an image of the user in identification document 475 may be compared to one or more images of the user captured from the live video stream.

If the comparison of identification document 475 to stored information matches, thereby supporting the claimed identity of the user, then computer system 101 may further request that the user submits address verification document 478 from a list of authorized address verification documents. Authorized address verification documents may include mail, such as bills and or statements from a recognized sender, such as utility bills, mortgage statements, bank statements and the like. Computer system 101 may then receive, from the user via the live video stream, an image of a hardcopy of address verification document 478, and compare the received image to a corresponding one of address verification documents 479. In some embodiments, rather than, or in addition to, comparing the image address verification document 478, OCR module 415 may be used to extract address information from address verification document 478 and compare the extracted address information to address information that has been previously recorded for the user.

It is noted that the embodiment of FIG. 4 is merely an example. Illustrated elements have been limited for clarity. Although database 450 is shown as including both stored identification documents 476 and stored address verification documents 479, this information may be stored across a plurality of databases, including various databases managed by different entities.

Figure 5:
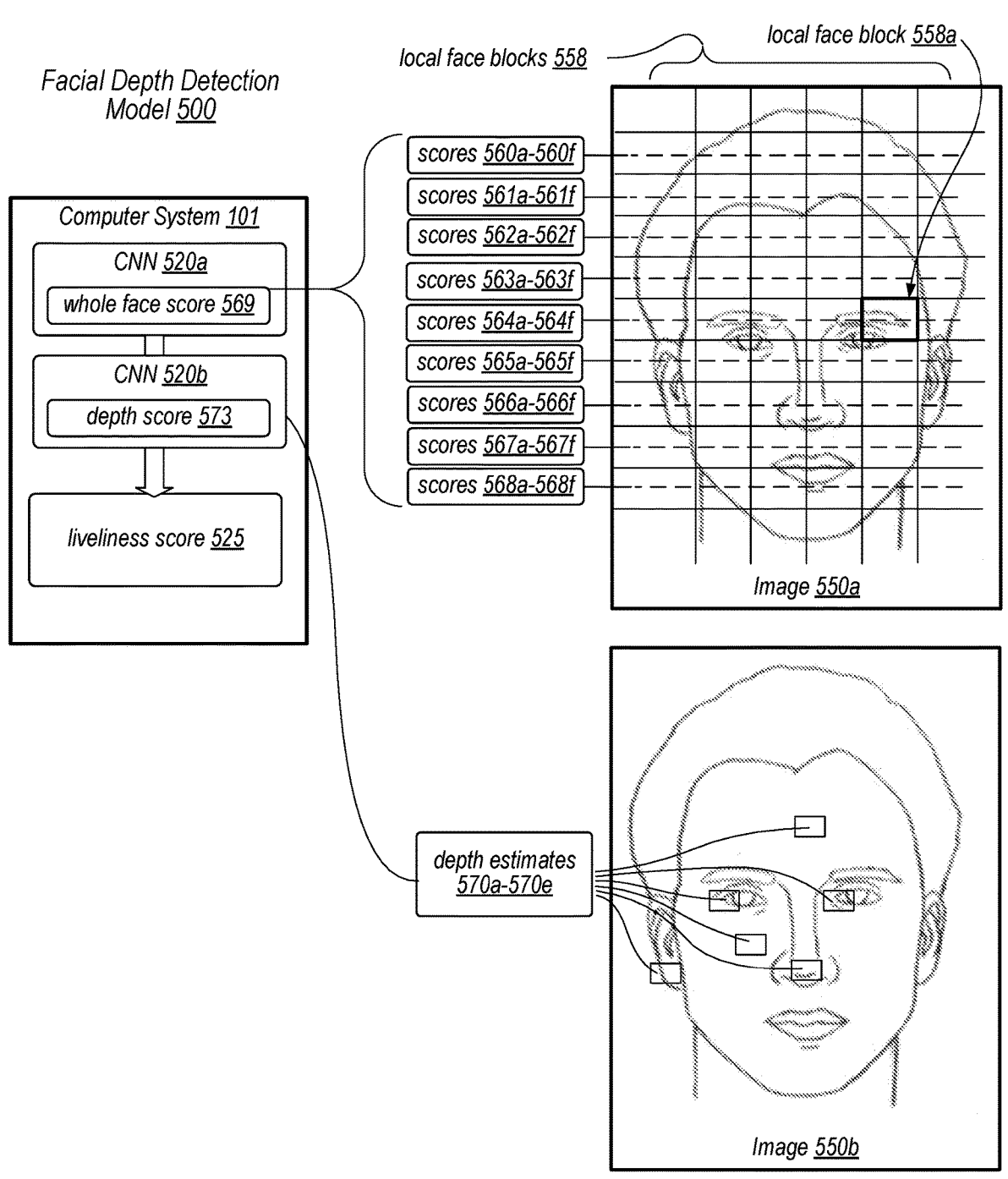
FIG. 5 shows an example of performing a facial depth detection model.

The description of FIG. 1, discloses detecting liveliness of the user from the received live video stream. Such liveliness detection may be used to detect cases in which a fraudulent entity may try to trick an automated interview system by holding a photo of a different person in front of a camera or even playing a video of the different person on a monitor that is placed in front of the camera. FIG. 5 depicts an example of how liveliness may be detected from a live video feed.

Moving now to FIG. 5, an example of performing a facial depth detection model is illustrated. Facial depth detection model 500 includes computer system 101 which further includes convolution neural networks (CNNs) 520a and 520b (collectively 520). Computer system 101 receives a live video stream (e.g., live video stream 170, as shown in FIG. 1) that includes an image of a user that is being authenticated. Respective copies of the image are sent to each of CNNs 520 as image 550a and 550b. Facial depth detection model 500 may be a software module performed by computer system 101, user device 180, and/or other computing systems described herein.

As described above, detecting liveliness of a user in a live video stream may include matching motions of the user in the live video stream to actions that the user is expected to perform, such as submitting requested documentation or performing specific actions requested by computer system 101. For example, computer system 101 may detect, using the live video stream, liveliness by detecting micro-motions in the user's face while the user displays the identification document. Such micromotions may include a facial twitch in the user's cheek, adjustment of an iris of one of the user's eyes, a flaring of a nostril while the user breathes, and the like.

While such analysis may be capable of detecting whether a person shown in the live video stream is animate or simply a photograph, modern technology enables fraudulent entities to apply artificial intelligence algorithms to a live video stream such as face spoofing and face morphing. Face spoofing involves training a model to take one or more images of a particular face and replace the fraudulent entity's face in the live video stream with the face from the images. Such a technique may be employed to impersonate the person in the images. Face morphing is similar, except the model is trained to combine features from the images to features of the fraudulent entity in the liv e video stream to generate a unique face with elements derived from averages of the images and the fraudulent entity. Face morphing may be used, not to impersonate another person, but to conceal an identity of the fraudulent entity. For example, the fraudulent entity may be a known criminal and/or individual banned from accessing any account on a service for which the authentication is being performed.

Accordingly, monitoring liveliness may include using facial depth detection model 500 that includes convolutional neural network (CNN) 520*a* that is operable to extract one or more of local face blocks 558 from images of the user's face from a live video stream, including image 550*a*. Local face blocks 558 correspond to portions of the user's face in image 550*a*. Local face block 558*a* is highlighted in FIG. 5 for reference. Dividing the user's face into a plurality of local face blocks 558 may improve an efficiency of facial depth detection model 500 by limiting analysis to a series of smaller calculations in which fewer features are extracted and compared within each block 558. Local face blocks 558 may be tracked across a sequence of two or more frames of the live video frame such that if the user's face moves from image to image, local face blocks 558 move with the face. Accordingly, local face block 558*a* may include a similar portion of the user's left eye and eyebrow in each image from the live video stream.

CNN 520*a* may analyze each of the extracted local face blocks 558 for various signs of liveliness, including indications as to whether the corresponding block appears to be a live person or a flat image from a photograph or monitor. CNN 520*a* may then assign a corresponding one of scores 560*a*-568*f* to respective ones of local face blocks 558. Each of scores 560*a*-568*f* may indicate a likelihood that the image of the user's face is real within the respective local face block 558. The analyzed elements within each block may include movement of light and shadow within a same local face block 558 across a sequence of images from the live video feed. For example, score 564*e* may correspond to local face block 558*a*. Score 564*e*, in some embodiments, may include one value generated for a plurality of images. This value of score 564*e* may provide an indication of the "realness" of local face block 558*a* across the plurality of images based on changes in shadows and/or reflections of light that are discernable within local face block 558*a*.

A corresponding whole face score 569 may then be generated based on an aggregation of scores 560*a*-568*f* for the plurality of images. By aggregating scores 560*a*-568*f*, a single whole face score 569 for the user's face may be determined. If few local face blocks 558 have scores indicative of a fake image of the user's face, then whole face score 569 may result in a value indicative of the user's face being real. For example, an average or mean value may be determined from scores 560*a*-568*f*. In some embodiments, scores 560*a*-568*f* may be weighted based on a number of distinct features that are visible in the respective local face block 558. Local face blocks 558 with numerous details (e.g., blocks that include portions of the eyes, nose, mouth, etc.) may be weighted higher than blocks featuring a forehead or cheek with few if any distinctive features (e.g., wrinkles, moles, freckles, and the like).

As illustrated, facial depth detection model 500 also includes CNN 520*b* that is operable to estimate a depth map of the user's face using one or more images, including image 550*b*, of the user's face. CNN 520*b* generates depth estimates 570*a*-570*e* (collectively 570) of the user's face in image 550*b*. CNN 520*b* performs a classification model on pixel points within image 550*b*, thereby generating the respective depth estimates. The classification model may look for a variety of features among groups of adjacent pixels, such as a light gradient across a given pixel group or other signs of uneven surfaces that may be indicative of varying depth. As above, depth estimates 570 may be determined across a sequence of images of the user's face, including image 550*b*. An aggregate depth score 573 may then be determined (e.g., by averaging) using the depth estimates 570. As described above, depth estimates 570 may be weighted based characteristics associated with the pixel points used to determine the respective depth estimate 570. Facial depth detection model 500 may then determine a single liveliness score using whole face score 569 and depth score 573. For example, whole face score 569 and depth score 573 may be added or averaged. The determined liveliness score 525 may be compared to a threshold value to indicate whether the user's face is real.

As disclosed above in regard to FIG. 3, the authorization system may be implemented as a distributed system, including as an edge computing system. In an edge computing embodiment, computer system 101 may correspond to one of local client servers 301 or one of devices 380. As such, computer system 101 may include a local version of CNNs 520. To improve an accuracy of CNNs 520 based on learning from a wide variety of training data available across all devices 380 and/or local client servers 301, computer system 101 may receive, from a federated server computer such as central online server 302, updates for CNNs 520. In addition, computer system 101 may send, to the federated server computer, parameters from usage of CNNs 520. In order to preserve confidentiality for the user, these sent parameters may exclude any captured personal information of the user. By sending the parameters to the federated server computer, the federated server computer may receive the received parameters from a wide variety of sources including, for example, devices 380 and local client servers 301. This wide sample of parameter may then be used to further train and update baseline versions of CNNs 520. As CNNs 520 are updated, the updated versions may be distributed back to devices 380 and/or local client servers 301. Accuracy of the authentication system, therefore, may benefit from increased usage.

It is noted that the example of FIG. 5 is one example for demonstrating disclosed concepts. Although only two CNNs are described, it is contemplated that other types of CNNs may be included in other embodiments to provide additional analysis. Two copies of a single image (550*a* and 550*b*) are illustrated. In other embodiments, the described CNNs may be operable across a sequence of images to generate a single liveliness score 525.

Figure 6:
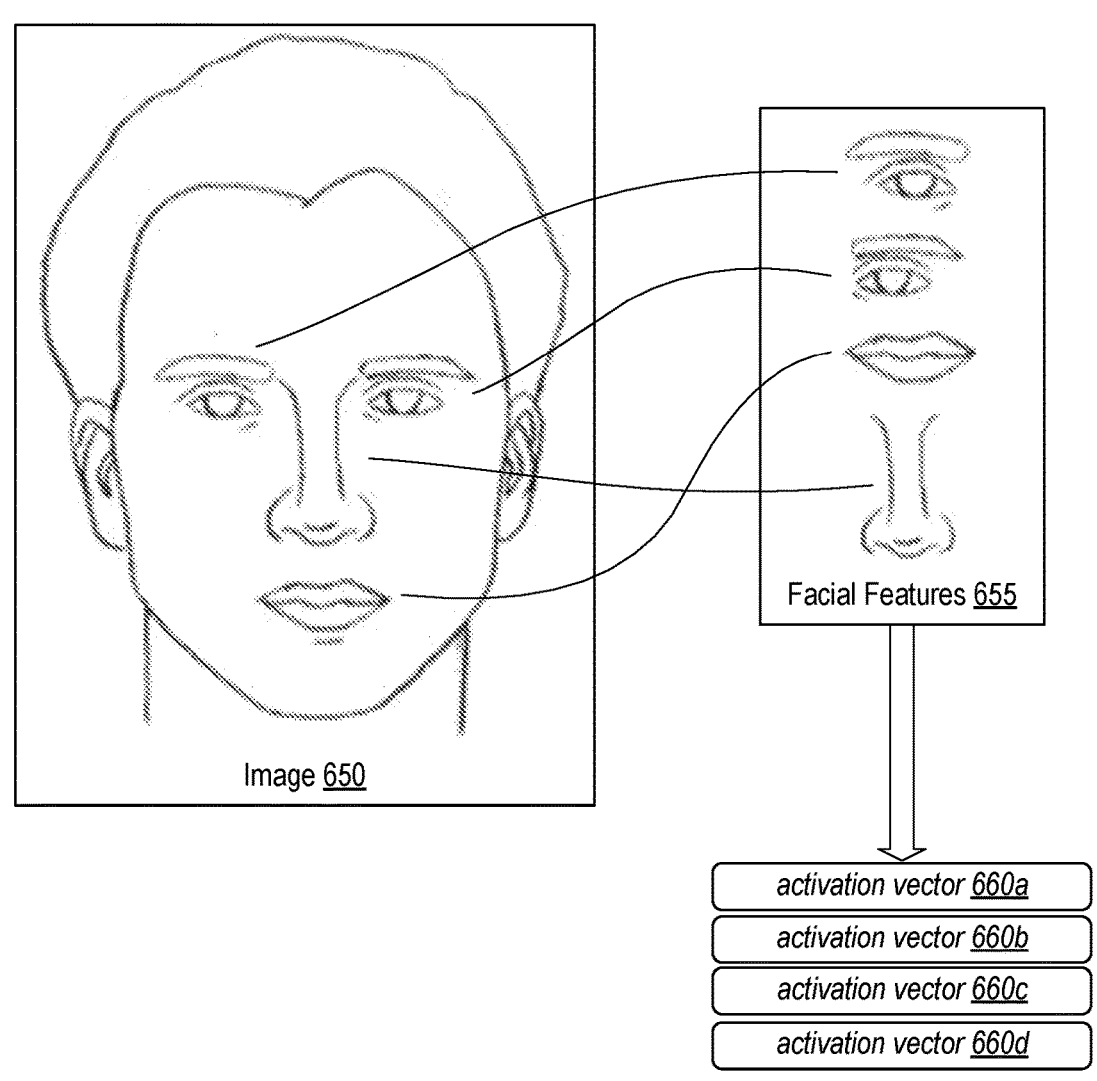
FIG. 6 depicts an example of performing a face spoofing detection model.
Figure 7:
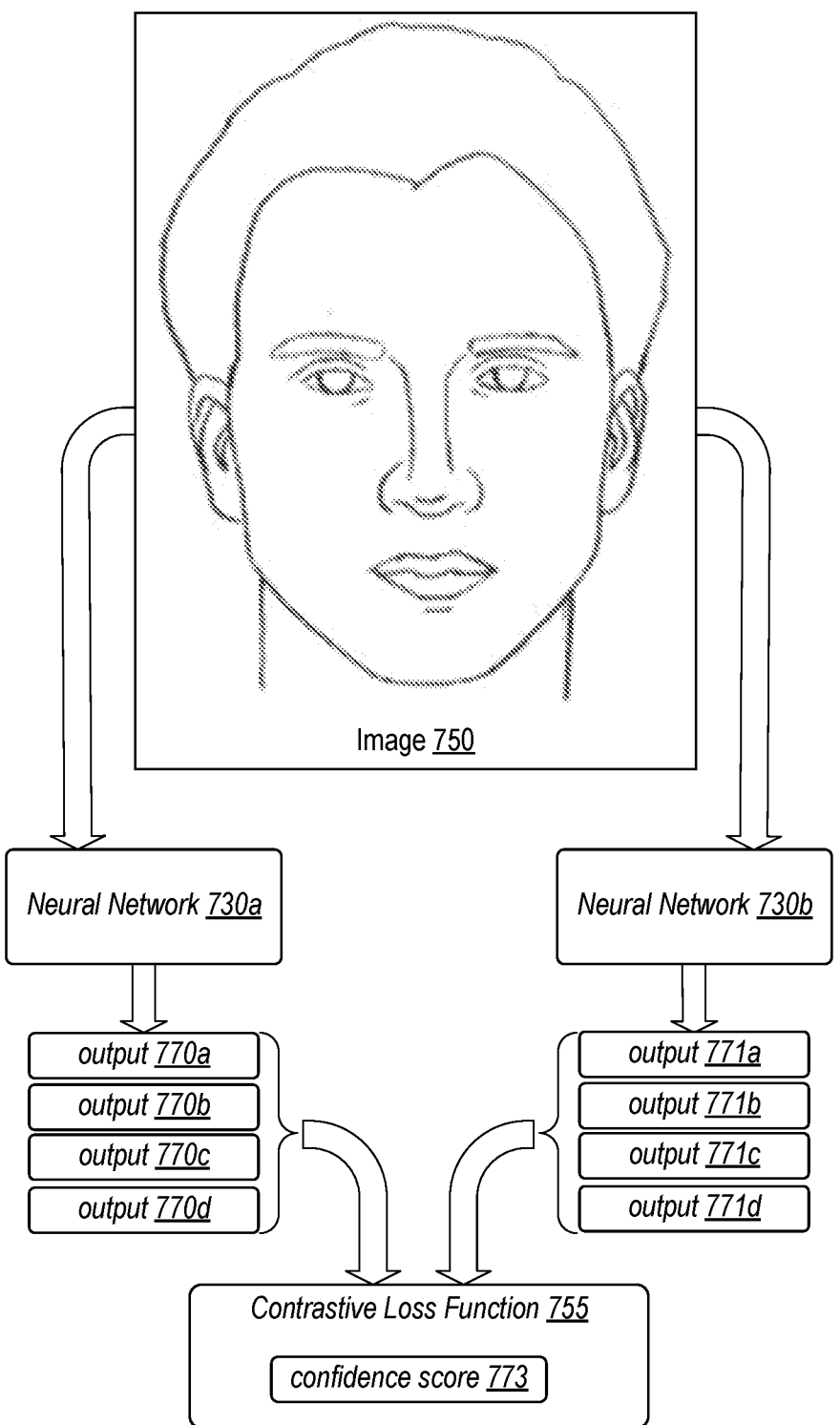
FIG. 7 illustrates an example of performing a face morphing detection model.
Figure 8:
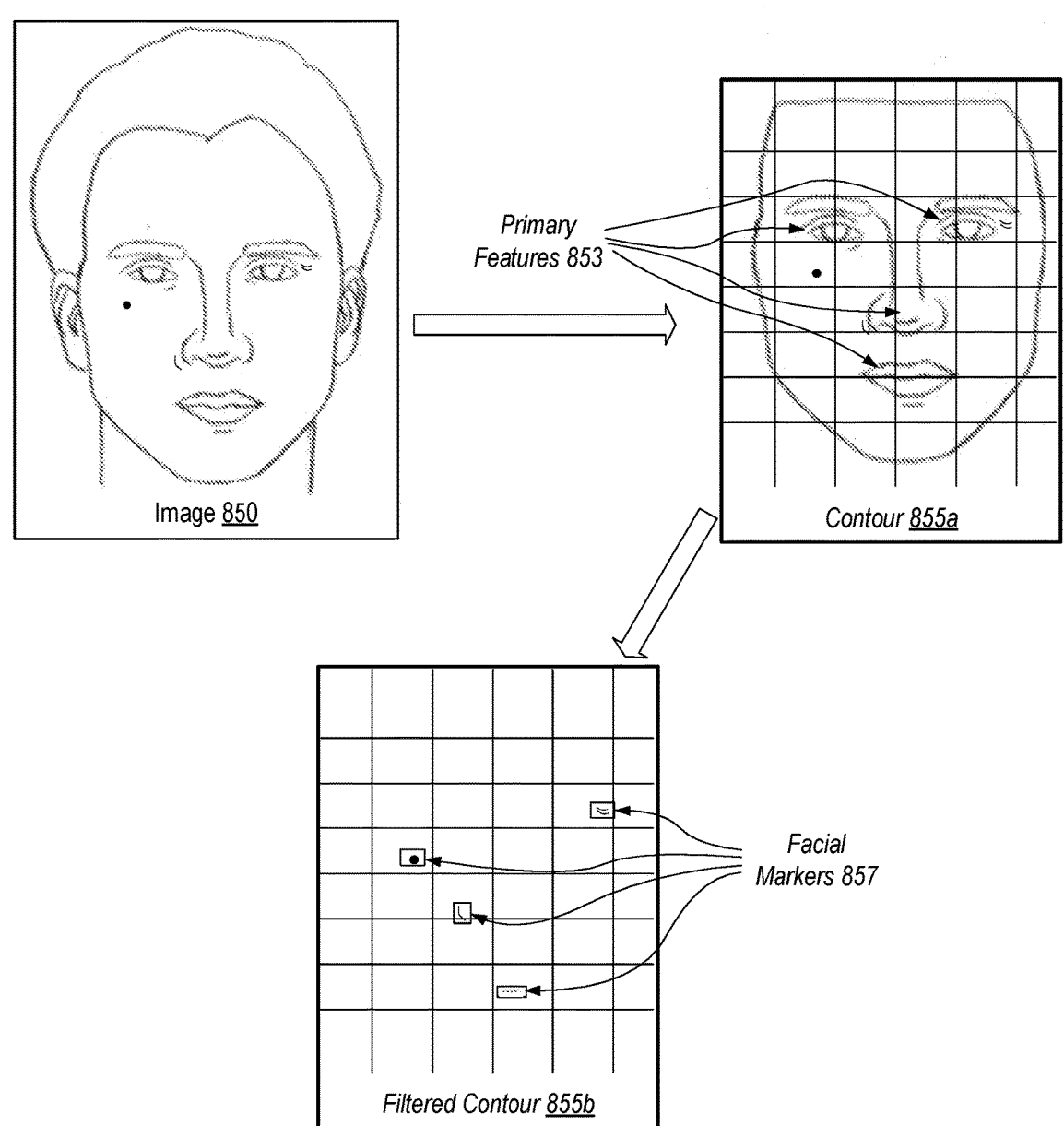
FIG. 8 shows an example of performing a face marker detection model.

The description of FIG. 2 discloses use of several detection models, including a face spoofing detection model 232a, a face morphing detection model 232b, and a face marker detection model 232c. A variety of techniques may be employed for implementing each of these models. FIGS. 6-8 illustrate respective examples of such models.

Turning now to FIG. 6, an example of a model for detecting face spoofing is illustrated. Face spoofing detection model 232a is an example of a technique that may be used to determine whether a face displayed in a live video stream is real or an image of one person's face superimposed onto a different person's head. Face spoofing detection model 232a may be another software module performed by computer system 101, 202, and/or other computing systems described herein.

Face spoofing is a technique that may enable a fraudulent entity to present a false appearance in a video-based identification and authentication system. As previously described, face spoofing may be employed to impersonate a particular person, and may be accomplished by training a model to take one or more images or video of a particular face and replace the fraudulent entity's face in a live video stream with the face from the images. Considering this, neural-network based techniques may be used to identify spatial inconsistencies in the live video stream and detect various forms of face spoofing.

Referring to distributed computing system 200 in FIG. 2, in response to computer system 101 determining to proceed with an authentication of a user, computer system 202 may perform face spoofing detection model 232a. In some embodiments, computer system 202 may perform face spoofing detection model 232a any time computer system 101 determines to proceed with an authentication of a user. In other embodiments, computer system 101 may, e.g., after performing facial depth detection model 500, provide one or more indications that a live video stream associated with a current authentication request shows signs of a face spoofing attack. Facial depth detection model 500 may be capable of detecting signs of a face spoofing attack, but in some embodiments, may not be trained to make an accurate judgement whether face spoofing is occurring. Accordingly, relevant information (such as frames from the live video stream) may be sent to computer system 202 to perform face spoofing detection model 232a.

As shown, computer system 202 identifies one or more particular facial features 655 from a plurality of images of the live video stream of the user, including image 650. For example, face spoofing detection model 232a may include identifying any one or more of eyes, eyebrows, a nose, lips, teeth if the user's mouth is open, freckles, moles, scars, dimples, ears, and the like. Computer system 202 assigns respective activation vectors 660a-660d (collectively 660) to corresponding facial features 655. Activation vectors 660 may include, for example, length, orientation, rotation, relative positions, and such, of facial features 655. Computer system 202 may then compare these activation vectors 660 to each other as well as to a position and/or pose of the user's face to determine whether the respective activation vectors 660 are consistent with movement of a real face. For example, do the user's eyes maintain a constant relative position to each other and to the user's face if a position of the user's head moves across two or more frames of the live video feed. The activation vectors 660 of the various facial features 655 should remain consistent to each other as the position of the head changes. If activation vector 660a corresponds to the user's right eye and activation vector 660b corresponds to the user's left eye, then computer system 202 may compare activation vectors 660a and 660b across several frames of the live video stream to determine whether changes from frame-to-frame of activation vector 660a are consistent with changes in activation vector 660b. A lack of consistency in such changes in the activation vectors 660 may indicate that one or more of facial features 655 are being generated by a computer system rather than being a natural part of a human face.

It is noted that FIG. 6 is an example of a face spoofing detection model used as part of a video-based authentication process. The face spoofing detection model is described as being performed by computer system 202 of distributed computer system 200 in FIG. 2. In other embodiments, however, some or all of face spoofing detection model 232a may be performed by computer system 101 or other computer system, including for example, a user's device.

Turning now to FIG. 7, an example of a model for detecting face morphing is illustrated. In a similar manner as described for face spoofing detection model 232a, face morphing detection model 232b is an example of a technique that may be used to determine whether a face displayed in a live video stream is real or is a computer-generated simulation combining features of two different faces. Face morphing detection model 232b may be another software module performed by computer system 101, 202, and/or other computing systems described herein.

Face morphing is a technique in which features from two different faces are merged into a common synthetic face image. In some embodiments, face morphing detection model 232b may include twin neural network techniques to detect a face morphing attack. Face morphing detection model 232b may use twin neural networks to extract semantic and syntactic features from the facial portion of the video and analyze the contrastive loss between the features extracted by each of the twin neural networks. Use of twin neural networks may allow for different "views" of faces. For example, the twin neural networks may use different learned parameters to analyze characteristics of a face. A same face may result in similar results from each neural network, while an image of a morphed face may result in the different neural networks highlighting different characteristics of the morphed face. Such different characteristics may be indicative of face morphing.

Again, referring to distributed computing system 200 in FIG. 2, in response to computer system 101 determining to proceed with an authentication of a user, computer system 202 may perform face morphing detection model 232b. In a manner similar to above, computer system 202 may perform face morphing detection model 232b any time computer system 101 determines to proceed with an authentication of a user, or may perform face morphing detection model 232b in response to one or more indications that a live video stream shows signs of a face morphing attack. For example, if facial depth detection model 500 detects signs of a face morphing attack, then relevant information may be sent to computer system 202 to perform face morphing detection model 232b.

As illustrated, computer system 202 may perform a face morphing detection model 232b in response to a determination to proceed with an authentication of a user. Face morphing detection model 232b may generate a respective set of outputs from each of twin neural networks 730a and 730b using one or more images from the of the live video stream of the user, including image 750. As depicted, neural network 730a generates outputs 770a-770d (collectively 770) while neural network 730b generates outputs 771a-771d (collectively 771). Face morphing detection model 232b may then use contrastive loss function 755 to measure contrastive loss between sets of outputs 770 and 771 to determine whether a face of the user is real. For example, neural network 730a may be trained to extract a first set of characteristics of a face, while neural network 730b may be trained to extract a second set of characteristics. Both of neural networks 730 may be trained on a same set of training data, such that outputs 770 and 771 have similar values when a real face is analyzed, while a morphed face results in increased distinction between outputs 770 and 771.

Contrastive loss function 755 may then be used to identify such distinctions. For example, contrastive loss function 755 may generate confidence score 773 based on similarities and/or differences between outputs 770 and 771. Confidence score 773 may, therefore, correspond to a probability that the features extracted by each of neural networks 730a and 730b are from a same face, e.g., a higher (or lower in other embodiments) value of confidence score 773 corresponds to a lower likelihood that a face morphing attack is being used in the live video stream.

It is noted that FIG. 7 is an example of a face morphing detection model used as part of a video-based authentication process. Similar to the face spoofing detection model, the face morphing detection model is described as being performed by computer system 202 of distributed computer system 200. Some or all of face morphing detection model 232b may be performed by computer system 101, a user's device, or other computer system.

Proceeding now to FIG. 8, an example of a face marker detection model is depicted. Face marker detection model 232c is an example of a technique that may be used to identify particular features of a face displayed in a live video stream. Distinctive facial markers like a mole or scar on a face may help to link the face to an identity of a particular person. Recognition of such face markers is important to judge whether a facial image in a live video stream is fake or real. As with face spoofing detection model 232a and face morphing detection model 232b, face marker detection model 232c may be another software module performed by computer system 101, 202, and/or other computing systems described herein.

Referring once again to distributed computing system 200 in FIG. 2, in response to computer system 101 determining to proceed with an authentication of a user, computer system 202 may perform face marker detection model 232c. Similar to the prior descriptions for models 232a and 232b, computer system 202 may perform face marker detection model 232c any time computer system 101 determines to proceed with an authentication of a user, or may perform face marker detection model 232c in response to one or more indications that images of a face in a live video stream includes distinctive features that may be useful for identifying the user.

As illustrated, computer system 202 may perform face marker detection model 232c in response to a determination to proceed with an authentication of a user. Face marker detection model 232c may identify one or more primary features 853 from one or more images of the live video stream of the user, including image 850. Primary features 853 may include features common to an average image of a face, such as eyes, eyebrows, nose, mouth, facial hair, and the like. Face marker detection model 232c may further identify contour 855a of the user's face in image 850. A coordinate system is established for contour 855a, and then primary features 853 are mapped to the coordinate system of contour 855a. Primary features 853 may then be filtered out of contour 855a, generating filtered contour 855b. Face marker detection model 232c may then identify one or more particular facial markers 857 from what remains in filtered contour 855b.

Visible markers that meet a particular threshold may be identified as facial markers 857. For example, the threshold may correspond to a particular size in pixels, a particular level of contrast between pixels of a given facial marker 857 and surrounding pixels, or other such characteristics. In some embodiments, each potential facial marker may be compared to a variety of thresholds to determine whether they are included in facial markers 857. Facial markers 857 may include, for example, scars, moles, birthmarks, uncommon wrinkles, other blemishes, and the like. Computer system 202 may determining whether the user's face is real based on the mapping of facial markers 857, e.g., by comparing mapping of facial markers 857 across a sequence of images from the live video stream.

It is noted that FIG. 8 is an example a face marking detection model used as part of a video-based authentication process. Similar to the face spoofing and face morphing detection models, the face marking detection model is described as being performed by computer system 202 of distributed computer system 200. In various embodiments, some or all of face marker detection model 232c may be performed by computer system 101, a user's device, or other computer system. The disclosed thresholds may be determined during training procedures and/or be hard-coded by, e.g., a software developer.

Figure 10:
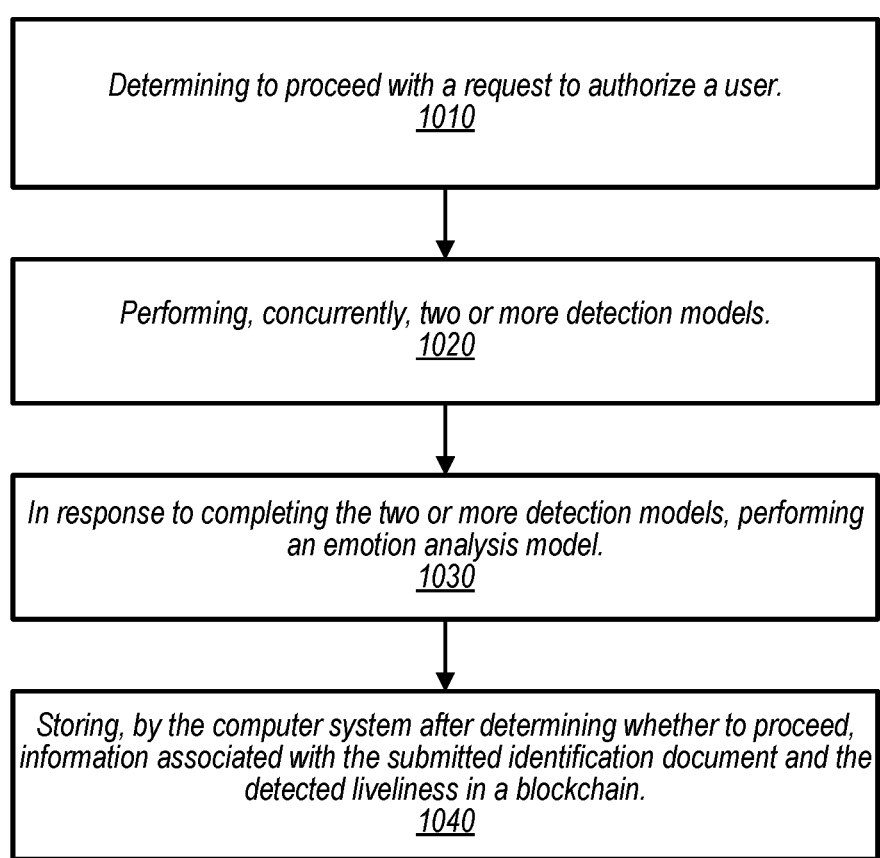
FIG. 10 illustrates a flow diagram of an embodiment of a method for performing a second stage of a live video authorization.

The systems described above in regard to FIGS. 1-8 may perform the disclosed techniques using a variety of methods. FIGS. 9-11 illustrate three example methods.

Proceeding now to FIG. 9, a flow diagram for an embodiment of a method for performing a live video user authentication is shown. Method 900 may be performed by a computer system such as any suitable ones of computer systems 101 or 202, devices 380, local client servers 301, or central online server 302 as shown in the various figures. In some embodiments, method 900 may be performed by a combination of such computer systems. Using FIG. 1 as an example, computer system 101 may include (or have access to) a non-transient, computer-readable memory having program instructions stored thereon that are executable by computer system 101 to cause the operations described with reference to FIG. 9. Method 900 is described below using computer system 101 of FIG. 1 as an example. References to elements in FIG. 1 are included as non-limiting examples.

Method 900 begins at 910 by receiving, by a computer system from a user, a request to authorize the user. As illustrated, method 900 includes computer system 101 receiving authorization request 160 from user 190. As previously disclosed, authorization request 160 may be part of a request to create a new account for user 190, a request to access an existing account, a request to perform an electronic exchange, and the like. For example, user 190 may request to access an account with restricted access and, therefore, requires users to be thoroughly verified prior to being granted access. Accordingly, computer system 101 may determine that authorization request 160 requires an advanced authentication of user 190 in order to proceed.

At 920, method 900 continues by receiving, by the computer system, a live video stream of the user. Method 900, for example, includes performing an advanced authentication by receiving, via computer system 101, live video stream 170 of user 190. For example, in response to receiving authorization request 160, computer system 101 performs authorization screening module 110 which causes user device 180 to request user 190 to initiate live video stream 170. In response to user 190 accepting this request, live video stream 170 is captured using a camera coupled to user device 180 (e.g., a camera in a smartphone, laptop, or tablet computer, or webcam connected to a desktop computer) and sent to computer system 101.

Method 900 proceeds at 930 by requesting, by the computer system, the user to submit an identification document from a list of authorized identification documents. Computer system 101 may, for example, request user 190 to submit an identification document from a list of authorized identification documents displayed via an interface on a screen of user device 180. The interface may request that user 190 displays identification document 175 in front of the camera that is capturing live video stream 170. Images of identification document 175 may be received by computer system 101 using document analysis module 130. One or more techniques, such as described above, may be used to validate identification document 175 with images of the same document that have previously been received, and/or validate against other previously received information from user 190.

At 940, method 900 further continues by detecting, by the computer system while the user submits the identification document, liveliness of the user in the live video stream by using a gesture recognition operation. For example, gesture recognition module 120 may monitor liveliness of user 190 in live video stream 170 while user 190 holds identification document 175 in front of the camera. Detecting the liveliness of user 190 may include aligning motions of user 190 to input received by computer system 101 via a user interface displayed on user device 180. Timing of motions of user 190 to press a particular element displayed on a touchscreen of user device 180, or manipulate a mouse to click on an element of the interface may be compared to timing for computer system 101 receiving identification document 175. Computer system 101 may, in some embodiments, establish a timing delay between user device 180 and computer system 101 in the background prior to and/or after receiving identification document 175. In addition, or alternatively, detecting liveliness may include requesting user 190 to perform a particular action in view of the camera, such as scratching their chin, holding a particular number of fingers up, and the like.

The method continues at block 950 by determining, using the submitted identification document and the detected liveliness, whether to proceed with the request to authorize the user. For example, computer system 101 may use one or more images of identification document 175 and identified gestures 125 to determine whether user 190 is a real person or a recorded and/or computer-generated visualization. In some embodiments, computer system 101 may determine that there are enough indications that user 190 in live video stream 170 is not a real person and may deny authorization request 160 without proceeding to perform additional analysis. In such cases, user 190 may, or may not, be provided with an indication as to why authorization request 160 failed. Otherwise, if computer system 101 determines that user 190 may be a real person, then computer system may proceed to perform additional analysis or send an indication to a different system (e.g., computer system 202 in FIG. 2) to perform the additional analysis.

It is noted that the method of FIG. 9 includes elements 910-950. Method 900 may end in 950 or may repeat some or all elements of the method. For example, method 900 may return to 910 to receive a new request to authorize a different user, or may return to 930 to request the user sends a different identification document. In some cases, method 900 may be performed concurrently with other instances of the method. For example, multiple instances of method 900 may be performed to concurrently process a plurality of received authorization requests for respective users.

Moving to FIG. 10, a flow diagram for an embodiment of a method for performing a second stage of a live video user authentication is shown. In a manner as described above for method 900, method 1000 may be performed by a computer system such as any of the computer systems, devices and servers disclosed herein, including, but not limited to computer system 202. Similar to the previously description for computer system 101, computer system 202 may include (or have access to) a non-transient, computer-readable memory having program instructions stored thereon that are executable by computer system 202 to cause the operations described with reference to FIG. 10. Method 1000 is described below using computer systems 101 and 202 of FIG. 2 as examples. References to elements in FIG. 2 are included as non-limiting examples. Method 1000 may, in some embodiments, begin after block 950 of method 900.

Method 1000 begins at 1010 by determining to proceed with a request to authorize a user. For example, as shown in FIG. 2, computer system 101 determines, using identification document 175 and identified gestures 125, to proceed with authorization of the user. Information included in the image of identification document 175 may match information in a corresponding identification document on file for the user, and identified gestures 125 may be consistent with gestures of a live person. Computer system 101 may, therefore, determine to proceed with the authentication.

At 1020, method 1000 continues by performing two or more detection models. For example, in response to the determination to proceed, computer system 101 may forward live video stream 170 to computer system 202. Computer system 202 may perform two or more of detection models 230, such as face spoofing detection model 232a, face morphing detection model 232b, and/or face marker detection model 232c. In some embodiments, computer system 202 may perform all three of detection models 230 any time computer system 101 determines to proceed with an authentication of a user. In other embodiments, computer system 101 may, e.g., after performing facial depth detection model 500, provide one or more indications that a live video stream associated with a current authentication request includes signs consistent with one or more types of computer-generated and/or enhanced video manipulation. Accordingly, computer system 202 may select ones of detection models 230 based on the particular indication received from computer system 101.

Method 1000 continues at 1030 by, in response to completing the two or more detection models, performing an emotion analysis model. An emotional analysis model, such as emotional analysis model 250 in FIG. 2, may include determining a distance metric for one or more facial features from a baseline set of facial features. For example, emotional analysis model 250 may be used to identify facial features, and/or may use facial features identified by the detection models 230 that were performed. These identified facial features may include particular points of the user's face, such a plurality of points on the user's lips that enable emotional analysis model 250 to make a judgement whether the user is smiling, frowning, indifferent, and the like. In addition, points in the user's eyes and/or eye brows may be identified to determine if the user's eye movements correspond to similar emotions. Position of the user's head may also be used to determine whether the user is, for example, facing up, down, left, right, or directly ahead. Emotional analysis model 250 may further correlate the combination of facial features to any audio received from live video stream 170 to determine an emotional state of the user. This emotional state may then be used by computer system 202 to determine whether the user is being honest or if there are indications of deceit or other discomfort in the user's behavior. Indications of deceit or other questionable behavior may result in additional analysis being performed, or a denial of the user's authentication request.

At 1040, method 1000 continues by storing, by the computer system after determining whether to proceed, information associated with the submitted identification document and the detected liveliness by adding a new block to a blockchain. For example, user information 265 may be stored for future training purposes and/or for processing future authentication requests from the user. In some embodiments, user information 265 may include identified gestures 125 and/or identification document 175. Additionally, or alternatively, features extracted from models performed as a part of authorization screening module 110 may be included in user information 265. For example, facial depth detection model 500 may be performed as a part of authorization screening module 110 and features determined by CNNs 520 may be included in user information 265 such as, e.g., any of scores 560a-568f, depth estimates 570, and liveliness score 525.

In some embodiments, particular elements of personal information may be removed from user information 265 based on privacy laws in effect in the user's location. In other embodiments, blockchain 260 may be used to adequately protect the user's personal information. In some embodiments, user information 265 may be provided directly from computer system 101 to blockchain 260 to avoid any privacy concerns with sharing user information 265 with computer system 202.

It is noted that the method of FIG. 10 includes elements 1010-1040. Method 1000 may end in 1040 or may repeat some or all elements of the method. For example, method 1000 may repeat 1020 and 1030 to provide the emotional analysis model of 1030 with additional information by performing an additional detection model in 1020. In some cases, method 1000 may be performed concurrently with other instances of the method. For example, different instances of method 1000 may be performed for respective user authentication requests.

Moving to FIG. 11, a flow diagram for an embodiment of a method for performing a document analysis module is shown. In a manner as described above for method 900, method 1100 may be performed by a computer system such as any of the computer systems, devices and servers disclosed herein, including, but not limited to computer system 101. As previously described, computer system 101 may include (or have access to) a non-transient, computer-readable memory having program instructions stored thereon that are executable by computer system 101 to cause the operations described with reference to FIG. 11. Method 1100 is described below using computer system 101 of FIG. 4 as an example. References to elements in FIG. 4 are included as non-limiting examples. Method 1100 may, in some embodiments, be performed as a part of block 930 and/or block 950 of method 900.

Method 1100 begins at 1110 by receiving, by a computer system from a user, an image of a hardcopy of an identification document. For example, as disclosed above, computer system 101 may request the user to submit identification document 475 from a list of authorized identification documents. The user may further be instructed to display identification document 475 in front of a camera that is capturing a live video stream. Computer system 101 may extract images of identification document 475 from the live video stream to be used in the following operations.

At 1120, method 1100 continues by performing an optical character recognition (OCR) operation on the received image to generate a text version of the identification document. As shown in FIG. 4, computer system 101 uses OCR module 415 to generate a text version of at least portions of identification document 475. OCR module 415 may use one or more of the extracted images from the live video stream to perform the OCR operation. For example, light and shadows may obscure different portions of identification document 475 in different ones of the extracted images.

Method 1100 continues, in 1130, by comparing the text version of the identification document to a text version of the previously stored version of the identification document. For example, the generated text version of identification document 475 may then be compared to an equivalent text version of a corresponding one of stored identification documents 476. In some embodiments, the text version may be compared to information that was previously provided by user using means other than the particular identification document 475. For example, information included in identification document 475 (e.g., a birthdate) may have been submitted independently by the user at a previous point in time. A birthdate extracted by OCR module 415 may then be compared to the previously provided birthdate.

At 1140, method 1100 continues by requesting, by the computer system, the user to submit an address verification document from a list of authorized address verification documents. As depicted in FIG. 4, if the comparison of identification document 475 to stored information matches, then computer system 101 may further request that the user submits address verification document 478 from a list of authorized address verification documents. Authorized address verification documents may include mail from a recognized sender, or a different form of identification than provided as identification document 475. For example, a passport may be used as identification document 475 and a driver's licensed used as address verification document 478.

Method 1100 further includes, at 1150, receiving, by the computer system from the user, an image of a hardcopy of the address verification document. As described for identification document 475, the user may be instructed to hold address verification document 478 in front of the camera. Computer system 101 may then receive, from the user via the live video stream, one or more images of a hardcopy of address verification document 478.

At 1160, method 1100 proceeds by comparing the received image to a previously stored version of the address verification document. For example, computer system 101 compares the received image to a corresponding one of address verification documents 479. In some embodiments, rather than, or in addition to, comparing the image address verification document 478, OCR module 415 may be used to extract address information from address verification document 478 and compare the extracted address information to address information that has been previously recorded for the user.

It is noted that the method of FIG. 11 includes elements 1110-1160. Method 1100 may end in 1160 or may repeat some or all elements of the method. For example, method 1100 may repeat 1110 and 1120 to get a clear copy of the identification document, or repeat 1140 and 1150 to get a clear copy of address verification document 478. In some cases, method 1100 may be performed concurrently with other instances of the method. For example, different instances of method 1100 may be performed for respective user authentication requests.

Figure 12:
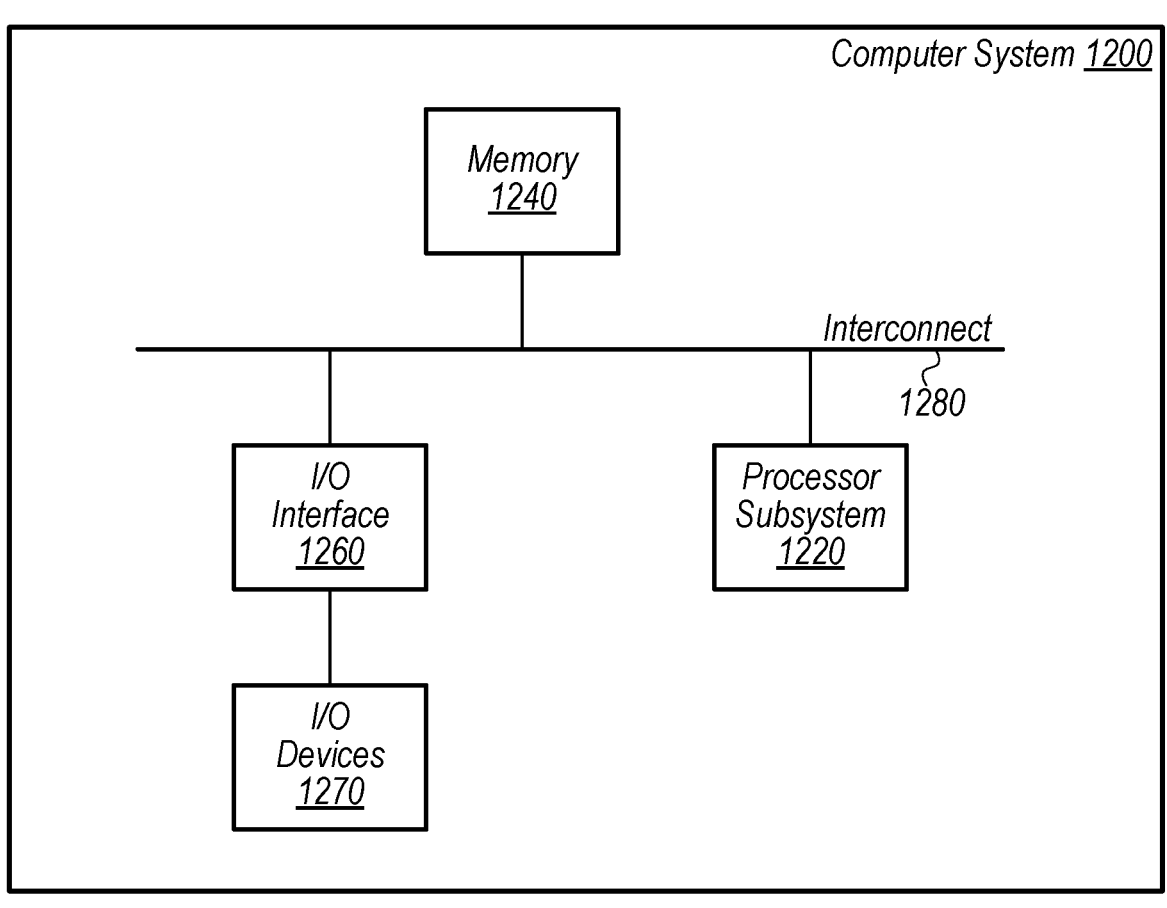
FIG. 12 a block diagram of an embodiment of a computer system that may be used to implement one or more embodiments of the disclosed system is depicted.

In the descriptions of FIGS. 1-11, various embodiments of a computer system for implementing the disclosed techniques have been disclosed, such as computer systems 101 and 202, user device 180, devices 380, central online server 302, and local client servers 301 as shown in various ones of FIGS. 1-5. These computer systems may be implemented in a variety of manners. FIG. 12 provides an example of a computer system that may correspond to one or more of the disclosed systems.

Referring now to FIG. 12, a block diagram of an example computer system 1200 is depicted. Computer system 1200 may, in various embodiments, be an implementation of one or more of the disclosed computer systems, such as computer systems 101 and 202. Computer system 1200 includes a processor subsystem 1220 that is coupled to a system memory 1240 and I/O interfaces(s) 1260 via an interconnect 1280 (e.g., a system bus). I/O interface(s) 1260 is coupled to one or more I/O devices 1270. Computer system 1200 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 1200 is shown in FIG. 12 for convenience, computer system 1200 may also be implemented as two or more computer systems operating together, e.g., as a virtual computer system.

Processor subsystem 1220 may include one or more processor circuits. In various embodiments of computer system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause computer system 1200 perform various operations described herein, including, for example, any of methods 900-1100. System memory 1240 may be implemented using any suitable type of memory circuits including, for example, different physical, non-transient, computer-readable media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory circuits in computer system 1200 are not limited to primary storage such as system memory 1240. Rather, computer system 1200 may also include other forms of storage such as cache memory in processor subsystem 1220 and secondary storage in I/O devices 1270 (e.g., a hard drive, storage array, etc.). In some embodiments, these other forms of storage may also store program instructions executable by processor subsystem 1220.

I/O interfaces 1260 may be any of various types of interfaces configured to couple to and communicate with other devices, according to various embodiments. In one embodiment, I/O interface 1260 is a bridge chip (e.g., Southbridge) from a front-side to one or more back-side buses. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1270 includes a network interface device (e.g., configured to communicate over Wi-Fi®, Bluetooth®, Ethernet, etc.), and computer system 1200 is coupled to a network via the network interface device.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various operations that are performed in the context of instructions executed by one or more computer systems. For example, methods 900-1100 are described as, in some embodiments, being performed by computer systems 101 and 202 as shown in various ones of FIGS. 1-5. In addition, various processes (e.g., authorization screening module 110 in FIG. 1) are described as being performed by a computer system such as computer systems 101 and 202 in various ones of FIGS. 1-5). Computer system 101 may include one or more computer systems included, for example, in one or more data centers (physical facilities that store data that drives enterprise computing applications and provides online services to users via, e.g., the Internet). These components, therefore, are implemented on physical structures (i.e., on computer hardware).

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processor circuits or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims.

Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

In this disclosure, various "modules" and "models" operable to perform designated functions are shown in the figures and described in detail (e.g., authorization screening module 110, gesture recognition module 120, document analysis module 130, detection models 230, emotional analysis model 250, facial depth detection model 500, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method comprising:

receiving, by a computer system from a user, a request to authorize the user;

receiving, by the computer system, a live video stream of the user that includes audio from the user;

requesting, by the computer system, the user to display an identification document via the live video stream;

detecting, by the computer system while the user displays the identification document, liveliness of the user in the live video stream by using a gesture recognition operation;

determining, based on the displayed identification document and the detected liveliness, whether to proceed with the request to authorize the user; and based on a decision to proceed, performing an analysis model that includes:

analyzing images of the user captured from the live video stream to determine a probable emotional state of the user;

comparing the probable emotional state to answers provided by the user via the audio from the user;

identifying, based on the comparison, indications of deceit in the answers provided by the user; and using the indications of deceit to determine whether to authorize the user.

2. The method of claim 1, further comprising, in response to determining to proceed with the request to authorize the user, performing one or more detection models, including face spoofing detection, face morphing detection, or facial marker detection.

3. The method of claim 2, further comprising:

prior to performing the analysis model, performing two or more of the detection models.

4. The method of claim 2, wherein the computer system is a particular local client server, and the one or more detection models are performed by a central online server that is in communication with a plurality of local client servers; and wherein parameters learned by the particular local client server, excluding personal data, are passed to the central online server.

5. The method of claim 1, further comprising:

receiving, by the computer system from the user, a second image of a hardcopy of the identification document prior to the request to authorize the user; and comparing a first image of the identification document taken from the live video stream to the second image of the identification document.

6. The method of claim 5, wherein the comparing includes:

performing an optical character recognition operation on the first image to generate a first text version of the identification document; and comparing the first text version of the identification document to a second text version of the second image of the identification document.

7. The method of claim 5, further comprising:

requesting, by the computer system, the user to submit an address verification document from a list of authorized address verification documents;

receiving, by the computer system from the user, an image of a hardcopy of the address verification document; and comparing the received image of the address verification document to a previously stored version of the address verification document.

8. The method of claim 1, further comprising storing, by the computer system after determining whether to proceed, information associated with a first image of the displayed identification document and the detected liveliness by adding a new block to a blockchain.

9. The method of claim 1, wherein detecting the liveliness includes aligning motions of the user to input received by the computer system via a user interface.

10. A computer-readable, non-transient memory including instructions that when executed by a computer system, cause the computer system to perform operations including:

determining that a request from a user on a user device requires authentication of the user to proceed;

receiving, from a camera coupled to the user device, a live video stream of the user that includes audio from the user;

requesting the user to display, in front of the camera during the live video stream, an identification document from a list of authorized identification documents;

monitoring, while the user displays the identification document, liveliness of the user in the live video stream, wherein the monitoring includes using a gesture recognition operation;

determining, based on the displayed identification document and recognized gestures, whether to proceed with the authentication of the user; and based on a decision to proceed, performing an analysis model that includes:

analyzing images of facial features and movements of the user captured from the live video stream to determine a probable emotional state of the user;

correlating the facial features and movements of the user to audio of questions and answers between the user and an interviewer participating in the authentication of the user;

identifying, based on the correlation, indications of deceit in the answers provided by the user; and using the indications of deceit to determine whether to authorize the user.

11. The computer-readable, non-transient memory of claim 10, wherein the operations further include, in response to determining to proceed with the authentication of the user, performing a face spoofing detection model, including:

identifying one or more particular facial features from a plurality of images of the live video stream of the user;

assigning respective activation vectors to the one or more particular facial features; and determining whether the respective activation vectors are consistent with movement of a real face.

12. The computer-readable, non-transient memory of claim 10, wherein the operations further include, in response to determining to proceed with the authentication of the user, performing a face morphing detection model, including:

generating a respective set of outputs from each of twin neural networks using one or more images from the live video stream of the user; and measuring contrastive loss between the respective sets of outputs to determine whether a face of the user is real.

13. The computer-readable, non-transient memory of claim 10, wherein the operations further include, in response to determining to proceed with the authentication of the user, performing a facial marker detection model, including:

identifying one or more particular facial markers from one or more images of the live video stream of the user;

identifying a contour of the user's face in the one or more images and mapping the one or more particular facial markers to the contour; and determining whether the user's face is real based on the mapping.

14. The computer-readable, non-transient memory of claim 10, wherein the operations further include monitoring liveliness using a facial depth detection model that includes a first convolutional neural network (CNN) that is operable to:

extract one or more local face blocks from one or more images of the user's face; and assign a corresponding score to respective ones of the local face blocks, each score indicating a likelihood that the user's face is real.

15. The computer-readable, non-transient memory of claim 14, wherein the facial depth detection model includes a second CNN that is operable to estimate a depth map of the user's face using the one or more images of the user's face.

16. A system comprising:

a processor circuit;

a camera circuit; and a memory circuit including instructions that when executed by the processor circuit, cause the system to perform operations including:

receiving, from a user, a request to access restricted information associated with the user;

in response to receiving an indication of user approval, generating, using the camera circuit, a live video stream of the user that includes audio from the user;

requesting, during the live video stream, the user to display an identification document from a list of authorized identification documents;

detecting, while the user displays the identification document, liveliness of the user in the live video stream by using a gesture recognition operation;

determining, based on the displayed identification document and the detected liveliness, whether to proceed with authorization of the user; and based on a decision to proceed, performing an analysis model to determine an indication of the user's honesty, the analysis model including:

correlating images of facial features and movements of the user to audio of answers provided by the user;

identifying, based on the correlation, indications of deceit in the answers provided by the user; and using the indications of deceit to determine whether to authorize the user.

17. The system of claim 16, wherein the operations further include detecting the liveliness by:

requesting the user to perform a particular action in view of the camera circuit; and determine, using the live video stream, whether the user performed the particular action.

18. The system of claim 16, wherein the operations further include detecting, using the live video stream, the liveliness by detecting micro-motions in the user's face while the user displays the identification document.

19. The system of claim 16, wherein the operations further include detecting the liveliness using a facial depth detection model that includes:

a first convolutional neural network (CNN) that is operable to:

extract one or more local face blocks from one or more images of the user's face; and assign a corresponding score to respective ones of the local face blocks, each score indicating a likelihood that the user's face is real; and a second CNN that is operable to estimate a depth map of the user's face using the one or more images of the user's face.

20. The system of claim 19, wherein the operations further include:

receiving, from a federated server computer, updates for the first and second CNNs; and sending, to the federated server computer, parameters from usage of the first and second CNNs with the live video stream, wherein the parameters exclude personal information of the user.

* * * * *